(12) United States Patent
Uehara et al.

(10) Patent No.: US 10,664,096 B2
(45) Date of Patent: May 26, 2020

(54) DETECTION APPARATUS AND DISPLAY APPARATUS

(71) Applicant: Japan Display Inc., Tokyo (JP)

(72) Inventors: Toshinori Uehara, Tokyo (JP); Hayato Kurasawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/139,759

(22) Filed: Sep. 24, 2018

(65) Prior Publication Data

US 2019/0102039 A1    Apr. 4, 2019

(30) Foreign Application Priority Data

Sep. 29, 2017 (JP) ................................ 2017-192027

(51) Int. Cl.
*G06F 3/041*        (2006.01)
*G06K 9/00*         (2006.01)
*G06F 3/044*        (2006.01)
*G06K 9/20*         (2006.01)

(52) U.S. Cl.
CPC ............ *G06F 3/0416* (2013.01); *G06F 3/044* (2013.01); *G06F 3/0412* (2013.01); *G06K 9/0002* (2013.01); *G06K 9/00986* (2013.01); *G06K 9/209* (2013.01)

(58) Field of Classification Search
CPC ...... G06F 3/044; G06F 3/0412; G06F 3/0416; G06K 9/0002
See application file for complete search history.

(56) References Cited

U.S. PATENT DOCUMENTS

| | | | |
|---|---|---|---|
| 2010/0315409 A1* | 12/2010 | Song | G09G 3/288 345/214 |
| 2014/0292709 A1 | 10/2014 | Mizuhashi et al. | |
| 2015/0370401 A1* | 12/2015 | Mizuhashi | G02F 1/13338 345/174 |
| 2017/0010730 A1* | 1/2017 | Chuang | G06F 3/0414 |

FOREIGN PATENT DOCUMENTS

| | | |
|---|---|---|
| JP | 2014199605 A | 10/2014 |
| WO | 2014038519 A1 | 3/2014 |

* cited by examiner

*Primary Examiner* — Kent W Chang
(74) *Attorney, Agent, or Firm* — K&L Gates LLP

(57) ABSTRACT

A detection apparatus includes a substrate, a plurality of first electrodes provided on the substrate, a first selection circuit provided on the substrate, the first selection circuit including a plurality of first input terminals that receive a first control signal supplied from an outside and a plurality of first output terminals that output a first selection signal based on the first control signal, and a second selection circuit provided on the substrate, the second selection circuit including a plurality of second input terminals that receive a second control signal supplied from the outside and a plurality of second output terminals that output a second selection signal based on the second control signal.

17 Claims, 32 Drawing Sheets

FIG.14

| PERIOD | Va3 | Va2 | Va1 | Vdd | Vd1 | Vd2 | Vd3 | Vd4 | Vd5 | Vd6 | Vd7 | Vd8 |
|---|---|---|---|---|---|---|---|---|---|---|---|---|
| ta1 | 0 | 0 | 0 | 1 | 1 | 1 | 1 | 1 | 1 | 1 | 1 | 1 |
| ta2 | 1 | 0 | 0 | 1 | 1 | 1 | 1 | 1 | 0 | 0 | 0 | 0 |
| ta3 | 0 | 1 | 0 | 1 | 1 | 1 | 0 | 0 | 1 | 1 | 0 | 0 |
| ta4 | 1 | 1 | 0 | 1 | 1 | 1 | 0 | 0 | 0 | 0 | 1 | 1 |
| ta5 | 0 | 0 | 1 | 1 | 1 | 0 | 1 | 0 | 1 | 0 | 1 | 0 |
| ta6 | 1 | 0 | 1 | 1 | 1 | 0 | 1 | 0 | 0 | 1 | 0 | 1 |
| ta7 | 0 | 1 | 1 | 1 | 1 | 0 | 0 | 1 | 1 | 0 | 0 | 1 |
| ta8 | 1 | 1 | 1 | 1 | 1 | 0 | 0 | 1 | 0 | 1 | 1 | 0 |

FIG.18

| PERIOD | Vs | Vb3 | Vb2 | Vb1 | Vf1 | Vf2 | Vf3 | Vf4 | Vf5 | Vf6 | Vf7 | Vf8 |
|---|---|---|---|---|---|---|---|---|---|---|---|---|
| tb1  | 0 | 0 | 0 | 0 | 1 | 1 | 1 | 1 | 1 | 1 | 1 | 1 |
| tb2  | 1 | 0 | 0 | 0 | 0 | 0 | 0 | 0 | 0 | 0 | 0 | 0 |
| tb3  | 0 | 1 | 0 | 0 | 1 | 1 | 1 | 1 | 0 | 0 | 0 | 0 |
| tb4  | 1 | 1 | 0 | 0 | 0 | 0 | 0 | 0 | 1 | 1 | 1 | 1 |
| tb5  | 0 | 0 | 1 | 0 | 1 | 1 | 0 | 0 | 1 | 1 | 0 | 0 |
| tb6  | 1 | 0 | 1 | 0 | 0 | 0 | 1 | 1 | 0 | 0 | 1 | 1 |
| tb7  | 0 | 1 | 1 | 0 | 1 | 1 | 0 | 0 | 0 | 0 | 1 | 1 |
| tb8  | 1 | 1 | 1 | 0 | 0 | 0 | 1 | 1 | 1 | 1 | 0 | 0 |
| tb9  | 0 | 0 | 0 | 1 | 1 | 0 | 1 | 0 | 1 | 0 | 1 | 0 |
| tb10 | 1 | 0 | 0 | 1 | 0 | 1 | 0 | 1 | 0 | 1 | 0 | 1 |
| tb11 | 0 | 1 | 0 | 1 | 1 | 0 | 1 | 0 | 0 | 1 | 0 | 1 |
| tb12 | 1 | 1 | 0 | 1 | 0 | 1 | 0 | 1 | 1 | 0 | 1 | 0 |
| tb13 | 0 | 0 | 1 | 1 | 1 | 0 | 0 | 1 | 1 | 0 | 0 | 1 |
| tb14 | 1 | 0 | 1 | 1 | 0 | 1 | 1 | 0 | 0 | 1 | 1 | 0 |
| tb15 | 0 | 1 | 1 | 1 | 1 | 0 | 0 | 1 | 0 | 1 | 1 | 0 |
| tb16 | 1 | 1 | 1 | 1 | 0 | 1 | 1 | 0 | 1 | 0 | 0 | 1 |

| PERIOD | PERIOD | Va3 | Va2 | Va1 | Vdd | Vs | Vb3 | Vb2 | Vb1 | DRIVE SIGNAL | DETECTION SIGNAL |
|---|---|---|---|---|---|---|---|---|---|---|---|
| ta1 | tb1 | 0 | 0 | 0 | 1 | 0 | 0 | 0 | 0 | Vc1···Vc64 | Vdet2-1 |
| | tb2 | 0 | 0 | 0 | 1 | 1 | 0 | 0 | 0 | Vc1···Vc64 | Vdet1-1 |
| | tb3 | 0 | 0 | 0 | 1 | 0 | 1 | 0 | 0 | Vc1···Vc64 | Vdet2-2 |
| | tb4 | 0 | 0 | 0 | 1 | 1 | 1 | 0 | 0 | Vc1···Vc64 | Vdet1-2 |
| | tb5 | 0 | 0 | 0 | 1 | 0 | 0 | 1 | 0 | Vc1···Vc64 | Vdet2-3 |
| | tb6 | 0 | 0 | 0 | 1 | 1 | 0 | 1 | 0 | Vc1···Vc64 | Vdet1-3 |
| | tb7 | 0 | 0 | 0 | 1 | 0 | 1 | 1 | 0 | Vc1···Vc64 | Vdet2-4 |
| | tb8 | 0 | 0 | 0 | 1 | 1 | 1 | 1 | 0 | Vc1···Vc64 | Vdet1-4 |
| | tb9 | 0 | 0 | 0 | 1 | 0 | 0 | 0 | 1 | Vc1···Vc64 | Vdet2-5 |
| | tb10 | 0 | 0 | 0 | 1 | 1 | 0 | 0 | 1 | Vc1···Vc64 | Vdet1-5 |
| | tb11 | 0 | 0 | 0 | 1 | 0 | 1 | 0 | 1 | Vc1···Vc64 | Vdet2-6 |
| | tb12 | 0 | 0 | 0 | 1 | 1 | 1 | 0 | 1 | Vc1···Vc64 | Vdet1-6 |
| | tb13 | 0 | 0 | 0 | 1 | 0 | 0 | 1 | 1 | Vc1···Vc64 | Vdet2-7 |
| | tb14 | 0 | 0 | 0 | 1 | 1 | 0 | 1 | 1 | Vc1···Vc64 | Vdet1-7 |
| | tb15 | 0 | 0 | 0 | 1 | 0 | 1 | 1 | 1 | Vc1···Vc64 | Vdet2-8 |
| | tb16 | 0 | 0 | 0 | 1 | 1 | 1 | 1 | 1 | Vc1···Vc64 | Vdet1-8 |
| ta2 | tb1 | 1 | 0 | 0 | 1 | 0 | 0 | 0 | 0 | Vc1···Vc64 | Vdet2-9 |
| | tb2 | 1 | 0 | 0 | 1 | 1 | 0 | 0 | 0 | Vc1···Vc64 | Vdet1-9 |
| | tb3 | 1 | 0 | 0 | 1 | 0 | 1 | 0 | 0 | Vc1···Vc64 | Vdet2-10 |
| | tb4 | 1 | 0 | 0 | 1 | 1 | 1 | 0 | 0 | Vc1···Vc64 | Vdet1-10 |
| | tb5 | 1 | 0 | 0 | 1 | 0 | 0 | 1 | 0 | Vc1···Vc64 | Vdet2-11 |
| | tb6 | 1 | 0 | 0 | 1 | 1 | 0 | 1 | 0 | Vc1···Vc64 | Vdet1-11 |
| | tb7 | 1 | 0 | 0 | 1 | 0 | 1 | 1 | 0 | Vc1···Vc64 | Vdet2-12 |
| | tb8 | 1 | 0 | 0 | 1 | 1 | 1 | 1 | 0 | Vc1···Vc64 | Vdet1-12 |
| | tb9 | 1 | 0 | 0 | 1 | 0 | 0 | 0 | 1 | Vc1···Vc64 | Vdet2-13 |
| | tb10 | 1 | 0 | 0 | 1 | 1 | 0 | 0 | 1 | Vc1···Vc64 | Vdet1-13 |
| | tb11 | 1 | 0 | 0 | 1 | 0 | 1 | 0 | 1 | Vc1···Vc64 | Vdet2-14 |
| | tb12 | 1 | 0 | 0 | 1 | 1 | 1 | 0 | 1 | Vc1···Vc64 | Vdet1-14 |
| | tb13 | 1 | 0 | 0 | 1 | 0 | 0 | 1 | 1 | Vc1···Vc64 | Vdet2-15 |
| | tb14 | 1 | 0 | 0 | 1 | 1 | 0 | 1 | 1 | Vc1···Vc64 | Vdet1-15 |
| | tb15 | 1 | 0 | 0 | 1 | 0 | 1 | 1 | 1 | Vc1···Vc64 | Vdet2-16 |
| | tb16 | 1 | 0 | 0 | 1 | 1 | 1 | 1 | 1 | Vc1···Vc64 | Vdet1-16 |
| ⋮ | ⋮ | ⋮ | ⋮ | ⋮ | ⋮ | ⋮ | ⋮ | ⋮ | ⋮ | ⋮ | ⋮ |
| ta8 | tb16 | 1 | 1 | 1 | 1 | 1 | 1 | 1 | 1 | Vc1···Vc64 | Vdet1-64 |

FIG.23

| N | N' | 1+N' | M | L | 2^M | 2^L | P | Q | P×Q |
|---|---|---|---|---|---|---|---|---|---|
| 16 | 4 | 5 | 2 | 2 | 4 | 4 | 4 | 4 | 16 |
| 20 | 5 | 6 | 2 | 3 | 4 | 8 | 4 | 5 | 20 |
| 24 | 5 | 6 | 2 | 3 | 4 | 8 | 4 | 6 | 24 |
| 28 | 5 | 6 | 2 | 3 | 4 | 8 | 4 | 7 | 28 |
| 32 | 5 | 6 | 2 | 3 | 4 | 8 | 4 | 8 | 32 |
| 36 | 6 | 7 | 3 | 3 | 8 | 8 | 8 | 5 | 40 |
| 40 | 6 | 7 | 3 | 3 | 8 | 8 | 8 | 5 | 40 |
| 44 | 6 | 7 | 3 | 3 | 8 | 8 | 8 | 6 | 48 |
| 48 | 6 | 7 | 3 | 3 | 8 | 8 | 8 | 6 | 48 |
| 52 | 6 | 7 | 3 | 3 | 8 | 8 | 8 | 7 | 56 |
| 56 | 6 | 7 | 3 | 3 | 8 | 8 | 8 | 7 | 56 |
| 60 | 6 | 7 | 3 | 3 | 8 | 8 | 8 | 8 | 64 |
| 64 | 6 | 7 | 3 | 3 | 8 | 8 | 8 | 8 | 64 |

DETECTION APPARATUS AND DISPLAY APPARATUS

CROSS-REFERENCE TO RELATED APPLICATIONS

This application claims priority from Japanese Application No. 2017-192027, filed on Sep. 29, 2017, the contents of which are incorporated by reference herein in its entirety.

BACKGROUND

1. Technical Field

The present disclosure relates to a detection apparatus and a display apparatus.

2. Description of the Related Art

There have recently been demands for performing fingerprint detection for personal identification by a capacitance method, for example. To perform fingerprint detection, electrodes having a smaller area are used than those used to detect contact of hands and fingers. Even if signals are obtained from such smaller electrodes, satisfactory detection sensitivity can be provided by code division multiplexing drive. Code division multiplexing drive is a driving method of selecting a plurality of drive electrodes simultaneously and supplying drive signals having the phases determined based on a predetermined code to the respective selected drive electrodes (refer to Japanese Patent Application Laid-open Publication No. 2014-199605 (JP-A-2014-199605).

In the display apparatus with a touch detection function described in JP-A-2014-199605, shift registers are provided for respective drive electrode blocks. The shift registers operate to sequentially supply selection signals to the respective drive electrode blocks. As a result, the drive electrode blocks are selected one by one. With this configuration, however, an increase in the number of electrodes may possibly increase the circuit size of the shift registers and the other components. Furthermore, an increase in the number of electrodes may possibly increase the time required to supply the selection signals.

SUMMARY

A detection apparatus according to one embodiment of the present disclosure includes a substrate, a plurality of first electrodes provided on the substrate, a first selection circuit provided on the substrate, the first selection circuit including a plurality of first input terminals that receive a first control signal supplied from an outside and a plurality of first output terminals that output a first selection signal based on the first control signal, and a second selection circuit provided on the substrate, the second selection circuit including a plurality of second input terminals that receive a second control signal supplied from the outside and a plurality of second output terminals that output a second selection signal based on the second control signal. The first electrodes are supplied with a drive signal having a phase determined based on the first selection signal and the second selection signal, and N≤P×Q is satisfied where N is number of the first electrodes, P is number of the first output terminals, and Q is number of the second output terminals.

A detection apparatus according to one embodiment of the present disclosure includes a substrate, a plurality of first electrodes provided on the substrate, drive signal supply lines coupled to the first electrodes and configured to supply a drive signal to the first electrodes respectively, a first selection circuit provided on the substrate and configured to provide a plurality of first selection signals, a plurality of first selection signal lines configured to output the first selection signals individually from the first selection circuit, a second selection circuit provided on the substrate and configured to provide a plurality of second selection signals, a plurality of second selection signal lines configured to output the second selection signals individually from the second selection circuit, and a plurality of third selection circuits provided on the substrate and coupled to drive signal supply line blocks respectively, the drive signal supply line blocks each including some of the drive signal supply lines. One of the third selection circuits is coupled to the plurality of the first selection signal lines and one of the second selection signal lines and provide the drive signal based on the first selection signals and one of the second selection signals.

A display apparatus according to one embodiment of the present disclosure includes the detection apparatus described above, and a display panel configured to display an image. The detection apparatus is provided on the display panel.

A display apparatus according to one embodiment of the present disclosure includes the detection apparatus described above, and a display panel configured to display an image. The first electrodes are common electrodes configured to supply a common potential to a plurality of pixels in the display panel.

BRIEF DESCRIPTION OF THE DRAWINGS

FIG. 14 is a table indicating the relation between the first control signals and the first selection signals;

FIG. 18 is a table indicating the relation between the second control signals and the inversion control signal, and the second selection signals;

FIG. 20 illustrates an example of a pattern code generated by the third selection circuit if the inversion control signal is at a high-level voltage;

FIG. 21 illustrates an example of a pattern code generated by the third selection circuit if the inversion control signal is at a low-level voltage;

FIG. 22 is a table indicating the relation between the first control signals, the second control signals and the inversion control signal, and detection signals;

FIG. 23 is a table for explaining the relation between the number of first electrodes and the number of terminals of the first selection circuit and the second selection circuit;

DETAILED DESCRIPTION

Figure 1:
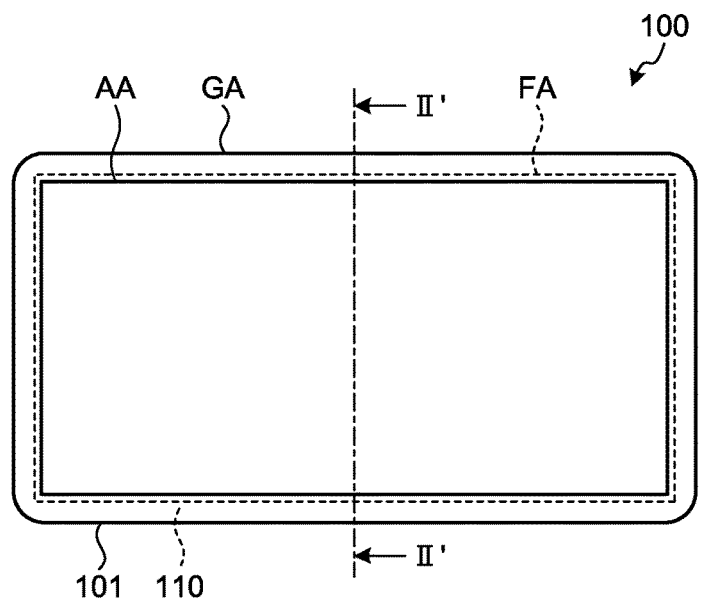
FIG. 1 is a plan view of a display apparatus including a detection apparatus according to a first embodiment of the present disclosure.

Exemplary aspects (embodiments) to embody the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below may be appropriately combined. What is disclosed herein is given by way of example only, and appropriate modifications made without departing from the spirit of the present disclosure and easily conceivable by those skilled in the art naturally fall within the scope of the disclosure. To simplify the explanation, the drawings may possibly illustrate the width, the thickness, the shape, and other elements of each component more schematically than the actual aspect. These elements, however, are given by way of example only and are not intended to limit interpretation of the present disclosure. In the present specification and the figures, components similar to those previously described with reference to previous figures are denoted by like reference numerals, and detailed explanation thereof may be appropriately omitted.

First Embodiment

Figure 2:
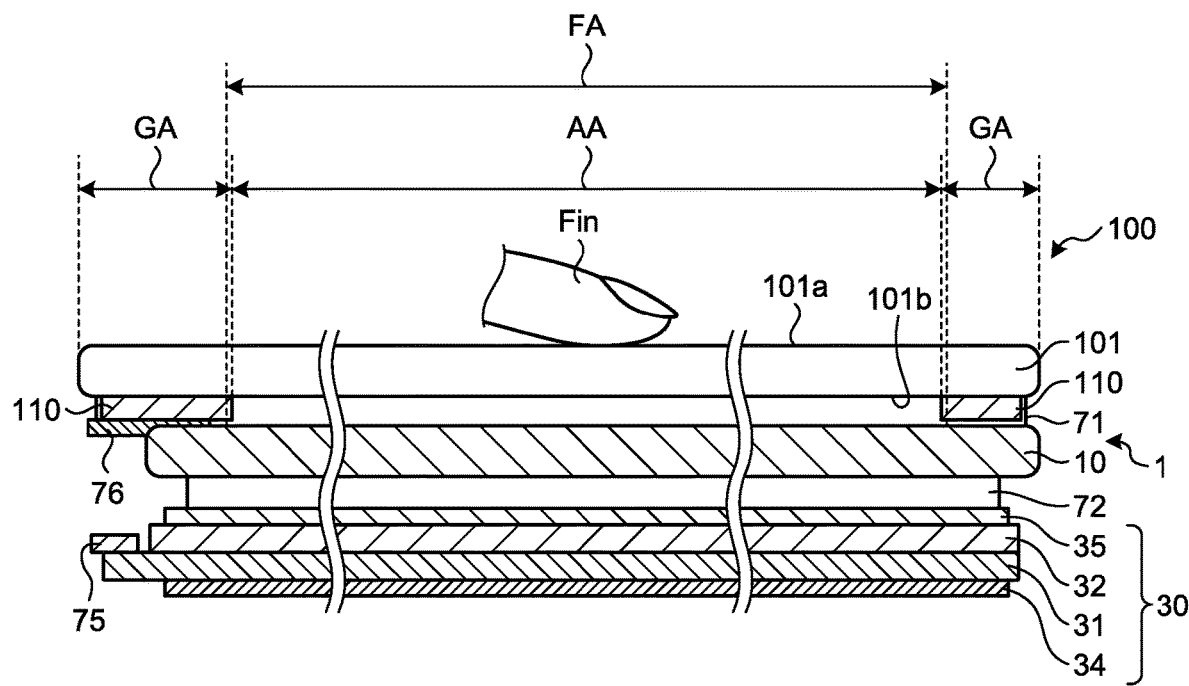
FIG. 2 is a sectional view along line II-II' in FIG. 1.

FIG. 1 is a plan view of a display apparatus including a detection apparatus according to a first embodiment of the present disclosure. FIG. 2 is a sectional view along line II-II' in FIG. 1. As illustrated in FIGS. 1 and 2, a display apparatus 100 according to the present embodiment has a display region AA, a frame region GA, and a detection region FA. The display region AA is a region for displaying an image on a display panel 30. The frame region GA is a region positioned outside the display region AA. The detection region FA is a region for detecting unevenness on the surface of a finger or the like in contact with or in proximity to the display apparatus 100. The detection region FA is provided overlapping the whole surface of the display region AA.

As illustrated in FIG. 2, the display apparatus 100 according to the present embodiment includes a cover member 101, a detection apparatus 1, and the display panel 30. The cover member 101 is a plate-like member having a first surface 101a and a second surface 101b opposite to the first surface 101a. The first surface 101a of the cover member 101 serves as a detection surface that detects unevenness on the surface of a finger Fin or the like in contact with or in proximity to the display apparatus 100 and as a display surface that displays an image on the display panel 30. The display panel 30 and a sensor 10 of the detection apparatus 1 are provided on the second surface 101b side of the cover member 101. The cover member 101 protects the sensor 10 and the display panel 30 and is provided to cover them. The cover member 101 is a glass substrate or a resin substrate, for example.

The cover member 101, the sensor 10, and the display panel 30 do not necessarily have a rectangular shape in planar view. The cover member 101, the sensor 10, and the display panel 30 may have a circular shape, an elliptical shape, or a deformed shape obtained by removing part of the outer shapes described above. The cover member 101, the sensor 10, and the display panel 30 may have different outer shapes. For example, the cover member 101 may have a circular shape, and the sensor 10 and the display panel 30 may have a regular polygonal shape. The cover member 101 does not necessarily have a flat plate shape. The display apparatus 100 may be a curved surface display having a curved surface in which the display region AA has a curved surface or in which the frame region GA is bent toward the display panel 30, for example.

As illustrated in FIGS. 1 and 2, a decorative layer 110 is provided in the frame region GA on the second surface 101b of the cover member 101. The decorative layer 110 is a colored layer having light transmittance lower than that of the cover member 101. The decorative layer 110 can prevent wiring, circuits, and other components provided overlapping the frame region GA from being visually recognized by an observer. While the decorative layer 110 is provided on the second surface 101b in the example illustrated in FIG. 2, it may be provided on the first surface 101a. The decorative layer 110 is not limited to a single layer and may have a multilayered structure including a plurality of layers.

The detection apparatus 1 includes the sensor 10 that detects unevenness on the surface of the finger Fin or the like in contact with or in proximity to the first surface 101a of the cover member 101. As illustrated in FIG. 2, the sensor 10 of the detection apparatus 1 is provided on the display panel 30. In other words, the sensor 10 is provided between the cover member 101 and the display panel 30 and overlaps the display panel 30 when viewed in a direction perpendicular to the first surface 101a. The sensor 10 is coupled to a flexible printed circuit board 76. The flexible printed circuit board 76 can output detection signals received from the sensor 10 to the outside.

One surface of the sensor 10 is bonded to the cover member 101 with an adhesive layer 71 interposed therebetween. The other surface of the sensor 10 is bonded to a polarizing plate 35 of the display panel 30 with an adhesive layer 72 interposed therebetween. The adhesive layer 71 is an optical clear resin (OCR) or a liquid optically clear adhesive (LOCA) serving as a liquid UV-curable resin, for example. The adhesive layer 72 is an optical clear adhesive (OCA), for example.

The display panel 30 includes a first substrate 31, a second substrate 32, a polarizing plate 34, and the polarizing plate 35. The polarizing plate 34 is provided under the first substrate 31. The polarizing plate 35 is provided on the second substrate 32. The first substrate 31 is coupled to a flexible printed circuit board 75. Liquid crystal display elements are provided between the first substrate 31 and the second substrate 32 to serve as a display layer. In other words, the display panel 30 is a liquid crystal panel. The display panel 30 is not limited thereto and may be an organic light-emitting diode (OLED), for example.

As illustrated in FIG. 2, the sensor 10 is disposed closer to the cover member 101 than the display panel 30 in a direction perpendicular to the second surface 101b of the cover member 101. This configuration can reduce the distance between detection electrodes for fingerprint detection and the first surface 101a serving as a detection surface compared with a case where the detection electrodes are integrated with the display panel 30, for example. Consequently, the display apparatus 100 including the detection apparatus 1 according to the present embodiment can improve the detection performance.

Figure 3:
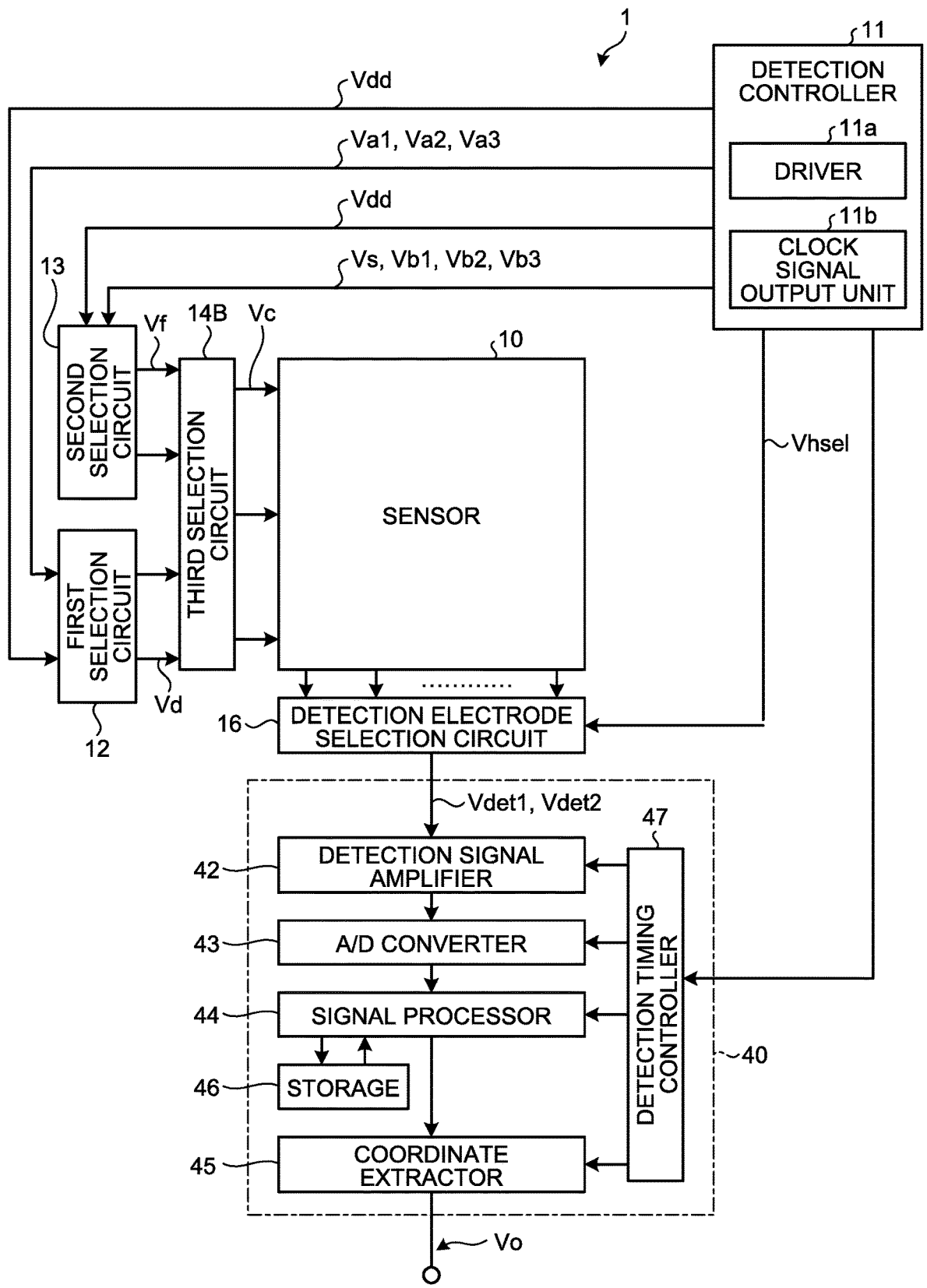
FIG. 3 is a block diagram of an exemplary configuration of the detection apparatus according to the first embodiment.

The following describes the configuration of the detection apparatus 1 in greater detail. FIG. 3 is a block diagram of an exemplary configuration of the detection apparatus according to the first embodiment. As illustrated in FIG. 3, the detection apparatus 1 includes the sensor 10, a detection controller 11, a first selection circuit 12, a second selection circuit 13, a third selection circuit 14B, a detection electrode selection circuit 16, and a detector 40.

The sensor 10 performs detection based on drive signals Vc supplied from the third selection circuit 14B by code division multiplexing drive (hereinafter, referred to as CDM drive). In other words, the sensor 10 selects a plurality of first electrodes Tx (refer to FIG. 5) simultaneously by operations of the first selection circuit 12, the second selection circuit 13, and the third selection circuit 14B. The third selection circuit 14B supplies the drive signals Vc having the phases determined based on a predetermined code to the respective selected first electrodes Tx. The sensor 10 detects unevenness on the surface of the finger Fin or a hand in contact with or in proximity to the detection apparatus 1 based on a mutual capacitance method, thereby detecting the shape of a fingerprint or a palm print.

The detection controller 11 is a circuit that supplies control signals to the first selection circuit 12, the second selection circuit 13, the detection electrode selection circuit 16, and the detector 40 to control their operations. The detection controller 11 includes a driver 11a and a clock signal output unit 11b. The driver 11a supplies a power source voltage Vdd to the first selection circuit 12 and the second selection circuit 13. The detection controller 11 supplies first control signals Va1, Va2, and Va3 to the first selection circuit 12 based on clock signals supplied from the clock signal output unit 11b. The detection controller 11 supplies second control signals Vb1, Vb2, and Vb3 and an inversion control signal Vs to the second selection circuit 13 based on the clock signals supplied from the clock signal output unit 11b.

The first selection circuit 12 and the second selection circuit 13 are decoder circuits. The first selection circuit 12 provides first selection signals Vd based on the first control signals Va1, Va2, and Va3 and supplies the first selection signals Vd to the third selection circuit 14B. The second selection circuit 13 provides second selection signals Vf based on the second control signals Vb1, Vb2, and Vb3 and supplies the second selection signals Vf to the third selection circuit 14B. The third selection circuit 14B is an exclusive OR (XOR) circuit, for example. The third selection circuit 14B provides the drive signals Vc based on the first selection signals Vd and the second selection signals Vf and supplies the drive signals Vc to the first electrodes Tx.

The detection electrode selection circuit 16 is a switch circuit that selects a plurality of second electrodes Rx (refer to FIG. 5) simultaneously. The detection electrode selection circuit 16 performs CDM drive based on second electrode selection signals Vhsel supplied from the detection controller 11. As a result, the detection electrode selection circuit 16 selects a plurality of second electrodes Rx.

The detector 40 is a circuit that determines whether a touch is made at a fine pitch based on the control signals supplied from the detection controller 11 and on first detection signals Vdet1 and second detection signals Vdet2 supplied from the sensor 10. The detector 40 includes a detection signal amplifier 42, an analog/digital (A/D) converter 43, a signal processor 44, a coordinate extractor 45, a storage 46, and a detection timing controller 47. The detection timing controller 47 controls the detection signal amplifier 42, the A/D converter 43, the signal processor 44, and the coordinate extractor 45 such that they operate synchronously with one another based on the control signals supplied from the detection controller 11. In the following description, the first detection signals Vdet1 and the second detection signals Vdet2 are simply referred to as detection signals Vdet when they need not be distinguished from each other.

The sensor 10 supplies the first detection signals Vdet1 and the second detection signals Vdet2 to the detection signal amplifier 42. The detection signal amplifier 42 amplifies the first detection signals Vdet1 and the second detection signals Vdet2. The A/D converter 43 converts analog signals output from the detection signal amplifier 42 into digital signals.

The signal processor 44 is a logic circuit that determines whether a touch is made on the sensor 10 based on the output signals from the A/D converter 43. The signal processor 44 receives the first detection signals Vdet1 and the second detection signals Vdet2 from the first electrodes Tx via the detection electrode selection circuit 16 and calculates third detection signals Vdet3. The signal processor 44 receives the calculated third detection signals Vdet3 and performs decoding on them based on a predetermined code. The signal processor 44 outputs the decoded signals. The signal processor 44 may detect unevenness on the surface of the finger Fin or a hand in contact with or in proximity to the detection apparatus 1 based on the decoded signals.

The storage 46 temporarily stores therein the calculated third detection signals Vdet3. The storage 46 is a random access memory (RAM), a read only memory (ROM), or a register circuit, for example.

The coordinate extractor 45 calculates the touch panel coordinates based on the decoded information and outputs the obtained touch panel coordinates as sensor output Vo. The coordinate extractor 45 may output the decoded signals as the sensor output Vo without calculating the touch panel coordinates.

Figure 4:
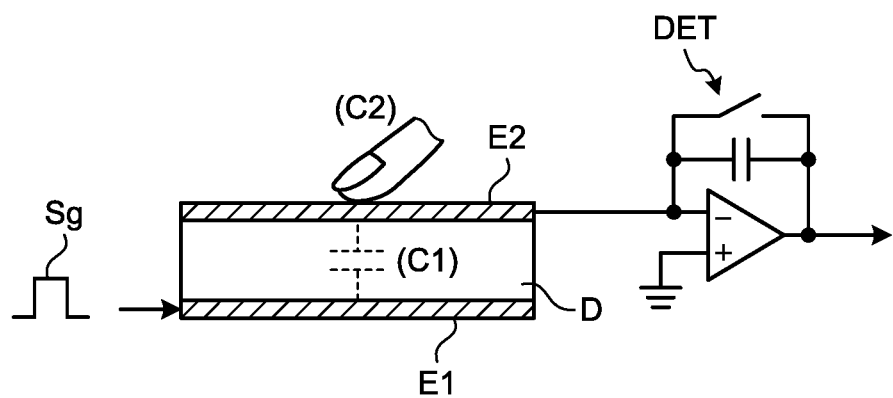
FIG. 4 is a diagram for explaining mutual capacitance touch detection.

The detection apparatus 1 performs capacitance touch detection. The following describes mutual capacitance touch detection performed by the detection apparatus 1 according to the present embodiment with reference to FIG. 4. FIG. 4 is a diagram for explaining mutual capacitance touch detection. FIG. 4 also illustrates a detection circuit.

As illustrated in FIG. 4, a capacitance element C1 includes a pair of electrodes, that is, a drive electrode E1 and a detection electrode E2 facing each other with a dielectric D interposed therebetween. The capacitance element C1 generates fringe lines of electric force extending from ends of the drive electrode E1 to the upper surface of the detection electrode E2 besides lines of electric force (not illustrated) formed between the facing surfaces of the drive electrode E1 and the detection electrode E2. A first end of the capacitance element C1 is coupled to an alternating-current (AC) signal source (drive signal source), and a second end thereof is coupled to a voltage detector DET. The voltage detector DET is an integration circuit included in the detector 40 illustrated in FIG. 3, for example.

The AC signal source applies an AC rectangular wave Sg at a predetermined frequency (e.g., a frequency of the order of several kilohertz to several hundred kilohertz) to the drive electrode E1 (first end of the capacitance element C1). An electric current corresponding to the capacitance value of the capacitance element C1 flows through the voltage detector DET. The voltage detector DET converts fluctuations in the electric current depending on the AC rectangular wave Sg into fluctuations in the voltage.

When capacitance C2 formed by the finger is in contact with the detection electrode E2 or comes closer to the detection electrode E2 close enough to consider it in contact therewith, the fringe lines of electric force between the drive electrode E1 and the detection electrode E2 are blocked by the conductor (finger). As a result, the capacitance element C1 acts as a capacitance element having a capacitance value smaller than that in a non-contact state as the capacitance C2 comes closer to the detection electrodes E2.

The amplitude of the voltage signals output from the voltage detector DET becomes smaller as unevenness or the like on the finger Fin approaches a contact state compared with the non-contact state. An absolute value |ΔV| of the voltage difference varies depending on an effect of an object to be detected in contact with or in proximity to the detection electrode E2. The detector 40 determines unevenness or the like on the finger Fin based on the absolute value |ΔV|. The detector 40 thus can perform touch detection based on the mutual capacitance method. The "contact state" includes a state where a finger is in contact with the detection surface or in proximity to the detection surface close enough to consider it in contact therewith. The "non-contact state" includes a state where a finger is neither in contact with the detection surface nor in proximity to the detection surface close enough to consider it in contact therewith.

Figure 5:
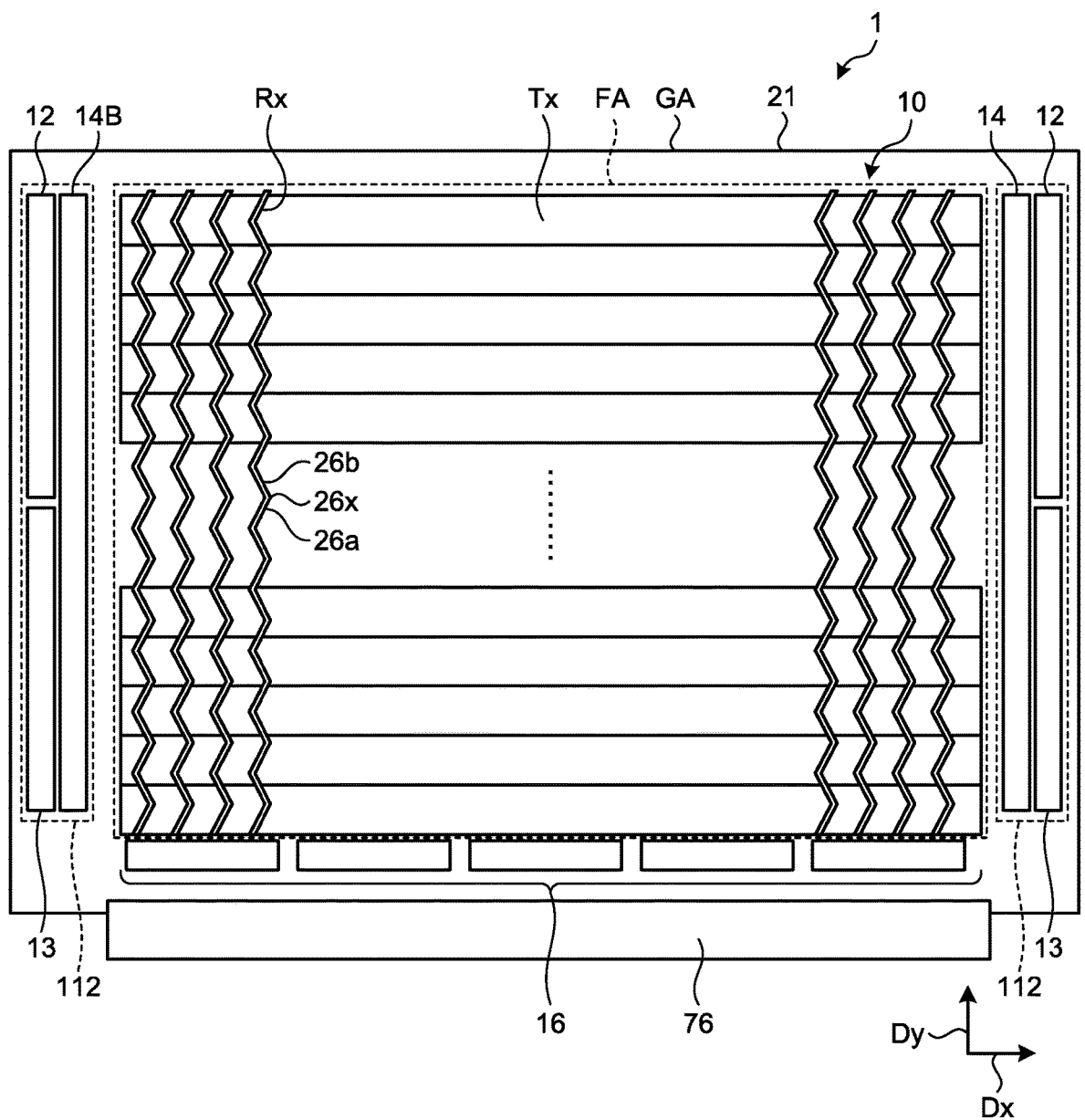
FIG. 5 is a plan view of the detection apparatus according to the first embodiment.
Figure 6:
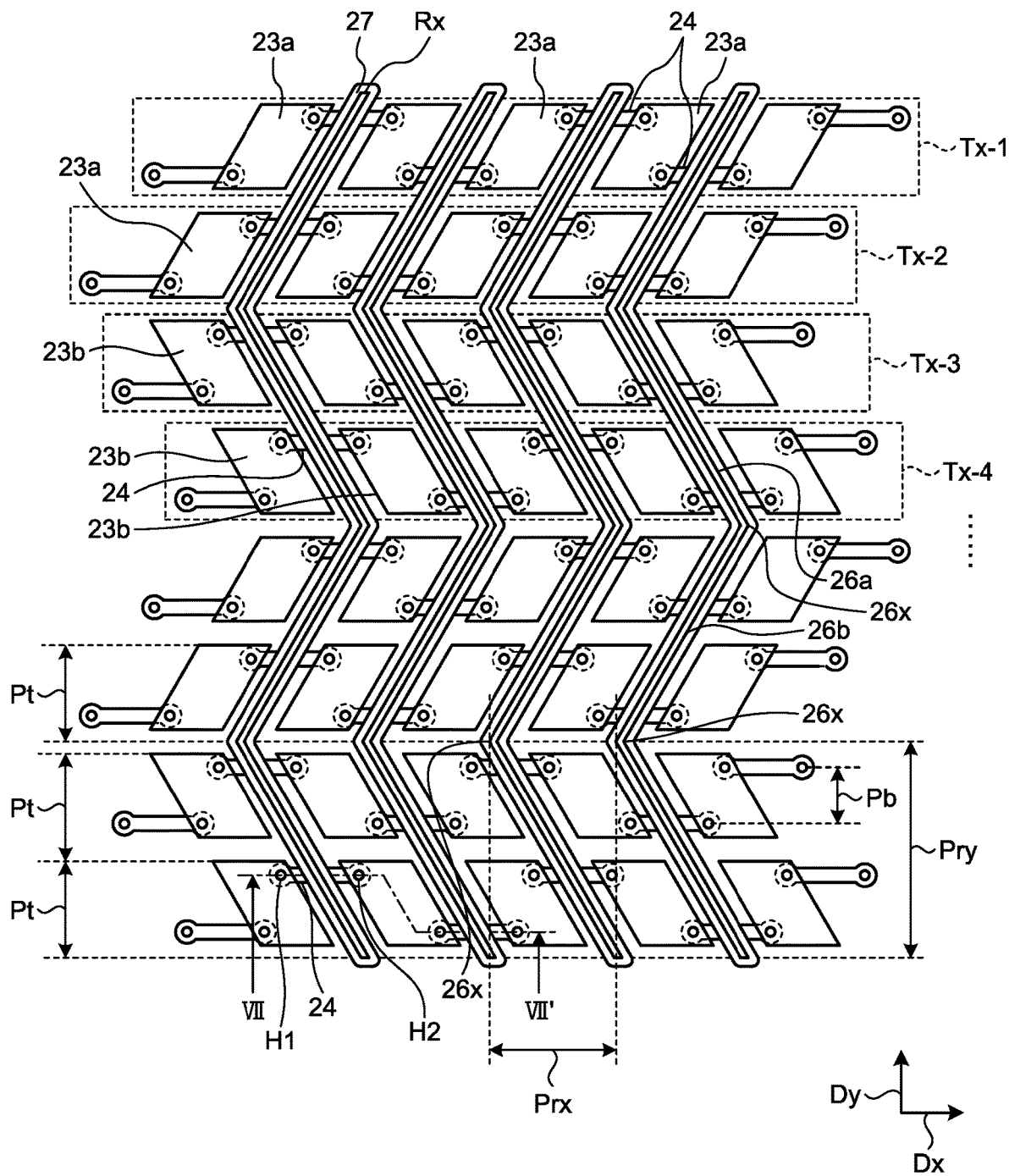
FIG. 6 is an enlarged plan view of part of first electrodes and second electrodes.
Figure 7:
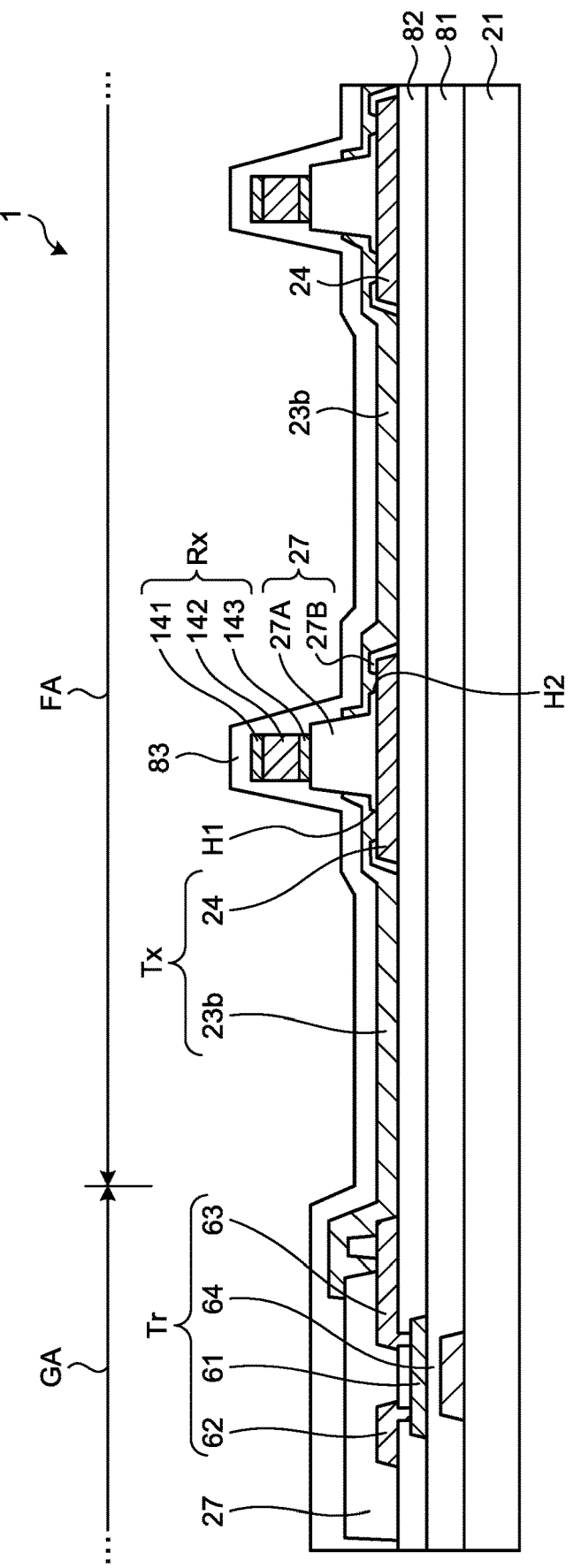
FIG. 7 is a sectional view along line VII-VII' in FIG. 6.

The following describes the configuration of the first electrodes Tx and the second electrodes Rx in the detection apparatus 1. FIG. 5 is a plan view of the detection apparatus according to the first embodiment. FIG. 6 is an enlarged plan view of part of the first electrodes and the second electrodes. FIG. 7 is a sectional view along line VII-VII' in FIG. 6.

As illustrated in FIG. 5, the detection apparatus 1 includes a sensor substrate 21 and a plurality of first electrodes Tx and second electrodes Rx provided on the sensor substrate 21. The sensor substrate 21 is a translucent glass substrate that enables visible light to pass therethrough. Alternatively, the sensor substrate 21 may be a translucent resin substrate or resin film made of a resin, such as polyimide. The sensor 10 is a translucent sensor.

The first electrodes Tx extend in a first direction Dx and are arrayed in a second direction Dy. The second electrodes Rx extend in the second direction Dy and are arrayed in the first direction Dx. The second electrodes Rx extend in a direction intersecting the first electrodes Tx in planar view. The second electrodes Rx are coupled to a flexible printed circuit board 76 provided on a short side of the frame region GA on the sensor substrate 21 via frame wiring (not illustrated). The first electrodes Tx and the second electrodes Rx are provided in the detection region FA. The first electrodes Tx are made of a translucent conductive material, such as indium tin oxide (ITO). The second electrodes Rx are made of a metal material, such as aluminum or an aluminum alloy. Alternatively, the first electrodes Tx may be made of a metal material, and the second electrodes Rx may be made of ITO. The use of the second electrodes Rx made of a metal material can reduce resistance on the detection signals Vdet.

The first direction Dx is a direction in a plane parallel to the sensor substrate 21 and is a direction parallel to one side of the detection region FA, for example. The second direction Dy is a direction in a plane parallel to the sensor substrate 21 and is a direction orthogonal to the first direction Dx. The second direction Dy does not necessarily orthogonally intersect the first direction Dx. In the present specification, the "planar view" indicates a view seen in a direction perpendicular to the sensor substrate 21.

Capacitance is formed at the intersections of the second electrodes Rx and the first electrodes Tx. To perform a mutual capacitance touch detection operation, the first selection circuit 12, the second selection circuit 13, and the third selection circuit 14B select the first electrodes Tx in the sensor 10 and supply the drive signals Vc to the selected first electrodes Tx simultaneously. The second electrodes Rx output the detection signals Vdet corresponding to changes in capacitance caused by unevenness on the surface of the finger or the like in contact with or in proximity to the detection apparatus 1. The detection apparatus 1 thus performs fingerprint detection.

In FIG. 5, various circuits, such as the first selection circuit 12, the second selection circuit 13, the third selection circuit 14B, and the detection electrode selection circuit 16, are provided in the frame region GA on the sensor substrate 21. The configuration is given by way of example only. At least part of the various circuits may be included in a detection integrated circuit (IC) mounted on the flexible printed circuit board 76. The first selection circuit 12, the second selection circuit 13, and the third selection circuit 14B are not necessarily provided as separated circuits. A first electrode selection circuit 112 including the functions of the first selection circuit 12, the second selection circuit 13, and the third selection circuit 14B may be provided. The first electrode selection circuit 112 may be a semiconductor integrated circuit (IC).

The following describes the configuration of the first electrodes Tx and the second electrodes Rx. As illustrated in FIG. 6, the second electrode Rx is a zigzag line, and the long side of the second electrode Rx extends in the second direction Dy as a whole. The second electrode Rx include a plurality of first linear portions 26a, a plurality of second linear portion 26b, and a plurality of bends 26x, for example. The second linear portions 26b extend in a direction intersecting the first linear portions 26a. The bend 26x couples the first linear portion 26a and the second linear portion 26b.

The first linear portion 26a extends in a direction intersecting the first direction Dx and the second direction Dy. The second linear portion 26b also extends in a direction intersecting the first direction Dx and the second direction Dy. The first linear portion 26a and the second linear portion 26b are disposed symmetrically about a virtual line (not illustrated) parallel to the first direction Dx. In the second electrode Rx, the first linear portions 26a and the second linear portions 26b are alternately coupled in the second direction Dy.

In each of the second electrodes Rx, Pry denotes an arrangement interval of the bends 26x in the second direction Dy. In the second electrodes Rx disposed side by side, Prx denotes an arrangement interval of the bends 26x in the first direction Dx. In the configuration according to the present embodiment, Prx<Pry is preferably satisfied, for example. The second electrode Rx does not necessarily have a zigzag shape and may have another shape, such as a wavy shape or a linear shape.

As illustrated in FIG. 6, a plurality of first electrodes Tx-1, Tx-2, Tx-3, Tx-4, . . . each include a plurality of electrode portions 23a or 23b and a plurality of couplers 24. In the following description, the first electrodes Tx-1, Tx-2, Tx-3, Tx-4, . . . are simply referred to as the first electrodes Tx when they need not be distinguished from one another.

The first electrodes Tx-1 and Tx-2 intersecting the second linear portions 26b of the second electrodes Rx include the electrode portions 23a having two sides parallel to the second linear portions 26b. The first electrodes Tx-3 and Tx-4 intersecting the first linear portions 26a of the second electrodes Rx include the electrode portions 23b having two sides parallel to the first linear portions 26a. In other words, a plurality of electrode portions 23a and 23b are disposed along the second electrodes Rx. This configuration can make the distances between the zigzag second electrodes Rx and the electrode portions 23a and 23b uniform in planar view.

In the first electrodes Tx-1 and Tx-2, the electrode portions 23a are arrayed in the first direction Dx and separated from each other. In each of the first electrodes Tx, the coupler 24 couples the electrode portions 23a disposed side by side out of the electrode portions 23a. Each of the second electrodes Rx extends through a space between the electrode portions 23a disposed side by side and intersect the couplers 24 in planar view. The first electrodes Tx-3 and Tx-4 also have the same configuration as described above. The second electrode Rx is a metal thin wire. The width of the second electrode Rx in the first direction Dx is smaller than that of the electrode portions 23a and 23b in the first direction Dx. This configuration reduces the area in which the first electrodes Tx and the second electrodes Rx overlap, thereby reducing stray capacitance.

Pt denotes an arrangement interval of the first electrodes Tx in the second direction Dy. The arrangement interval Pt is substantially one-half the arrangement interval Pry of the bends 26x of the second electrodes Rx. The configuration is not limited thereto, and the arrangement interval Pt may be other than a half-integer multiple of the arrangement interval Pry. The arrangement interval Pt is equal to or smaller than 100 μm, for example. In one first electrode Tx, the couplers 24 disposed side by side in the first direction Dx are alternately disposed with an arrangement interval Pb interposed therebetween in the second direction Dy. While the electrode portions 23a and 23b have a parallelogram shape, they may have another shape. The electrode portions 23a and 23b may have a rectangular, polygonal, or deformed shape, for example.

The following describes the layer structure of the detection apparatus 1 with reference to FIG. 7. In FIG. 7, the section of the frame region GA is a section of a portion including a thin-film transistor Tr in the first selection circuit 12, the second selection circuit 13, or the third selection circuit 14B. To explain the relation between the layer structure of the detection region FA and that of the frame region GA, FIG. 7 schematically illustrates the section along line VII-VII' in the detection region FA and the section of the portion including the thin-film transistor Tr in the frame region GA in a continuous manner.

As illustrated in FIG. 7, the detection apparatus 1 includes the thin-film transistors Tr in the frame region GA. The thin-film transistor Tr includes a semiconductor layer 61, a source electrode 62, a drain electrode 63, and a gate electrode 64. The gate electrode 64 is provided on the sensor substrate 21. A first interlayer insulating film 81 is provided on the sensor substrate 21 to cover the gate electrode 64. The gate electrode 64 is made of aluminum (Al), copper (Cu), silver (Ag), molybdenum (Mo), or an alloy of these metals. The first interlayer insulating film 81 is made of a silicon oxide film (SiO), a silicon nitride film (SiN), or a silicon oxynitride film (SiON). The first interlayer insulating film 81 is not necessarily a single layer and may be a multilayered film. The first interlayer insulating film 81, for example, may be a multilayered film in which a silicon nitride film is formed on a silicon oxide film.

The semiconductor layer 61 is provided on the first interlayer insulating film 81. A second interlayer insulating film 82 is provided on the first interlayer insulating film 81 to cover the semiconductor layer 61. The semiconductor layer 61 is exposed on the bottom of a contact hole formed in the second interlayer insulating film 82. The semiconductor layer 61 is made of polysilicon or an oxide semiconductor. The second interlayer insulating film 82 is made of a silicon oxide film, a silicon nitride film, or a silicon oxynitride film. The second interlayer insulating film 82 is not necessarily a single layer and may be a multilayered film. The second interlayer insulating film 82, for example, may be a multilayered film in which a silicon nitride film is formed on a silicon oxide film.

The source electrode 62 and the drain electrode 63 are provided on the second interlayer insulating film 82. The source electrode 62 and the drain electrode 63 are coupled to the semiconductor layer 61 through the contact hole formed in the second interlayer insulating film 82. The source electrode 62, the drain electrode 63, and the coupler 24 are made of titanium-aluminum (TiAl), which is an alloy of titanium and aluminum.

An insulating resin layer 27 and the electrode portion 23b and the coupler 24 of the first electrode Tx are provided on the second interlayer insulating film 82. The resin layer 27 provided in the frame region GA covers the source electrode 62 and the drain electrode 63. The drain electrode 63 is electrically coupled to the first electrode Tx through a contact hole formed in the resin layer 27 provided in the frame region GA.

The resin layer 27 provided in the detection region FA includes a first resin layer 27A and a second resin layer 27B thinner than the first resin layer 27A. The first resin layer 27A covers a portion of the coupler 24 positioned just under the second electrode Rx. The second resin layer 27B provided in the detection region FA covers a portion of the coupler 24 positioned just under the electrode portion 23b.

The second resin layer 27B has contact holes H1 and H2. In the detection region FA, peripheries of the electrode portions 23b are coupled to the coupler 24 through the contact holes H1 and H2. In this example, the electrode portion 23b is in contact with the second interlayer insulating film 82.

The second electrode Rx is provided on the first resin layer 27A. The second electrode Rx includes a first metal layer 141, a second metal layer 142, and a third metal layer 143, for example. The second metal layer 142 is provided on the third metal layer 143, and the first metal layer 141 is provided on the second metal layer 142. The first metal layer 141 and the third metal layer 143 are made of molybdenum or a molybdenum alloy, for example. The second metal layer 142 is made of aluminum or an aluminum alloy, for example. Molybdenum or a molybdenum alloy included in the first metal layer 141 has reflectance of visible light lower than that of aluminum or an aluminum alloy included in the second metal layer 142. This structure can prevent the second electrode Rx from being visually recognized.

An insulating film 83 is provided on the resin layer 27, the electrode portion 23b, and the second electrode Rx. The insulating film 83 covers the upper surface and the side surfaces of the second electrode Rx. The insulating film 83 is a film having a high refractive index and low reflectance, such as a silicon nitride film.

With the configuration described above, the first electrodes Tx and the second electrodes Rx are provided on the single sensor substrate 21. The first electrodes Tx and the second electrodes Rx are provided in different layers with the resin layers 27 serving as insulating layers interposed therebetween.

Figure 8:
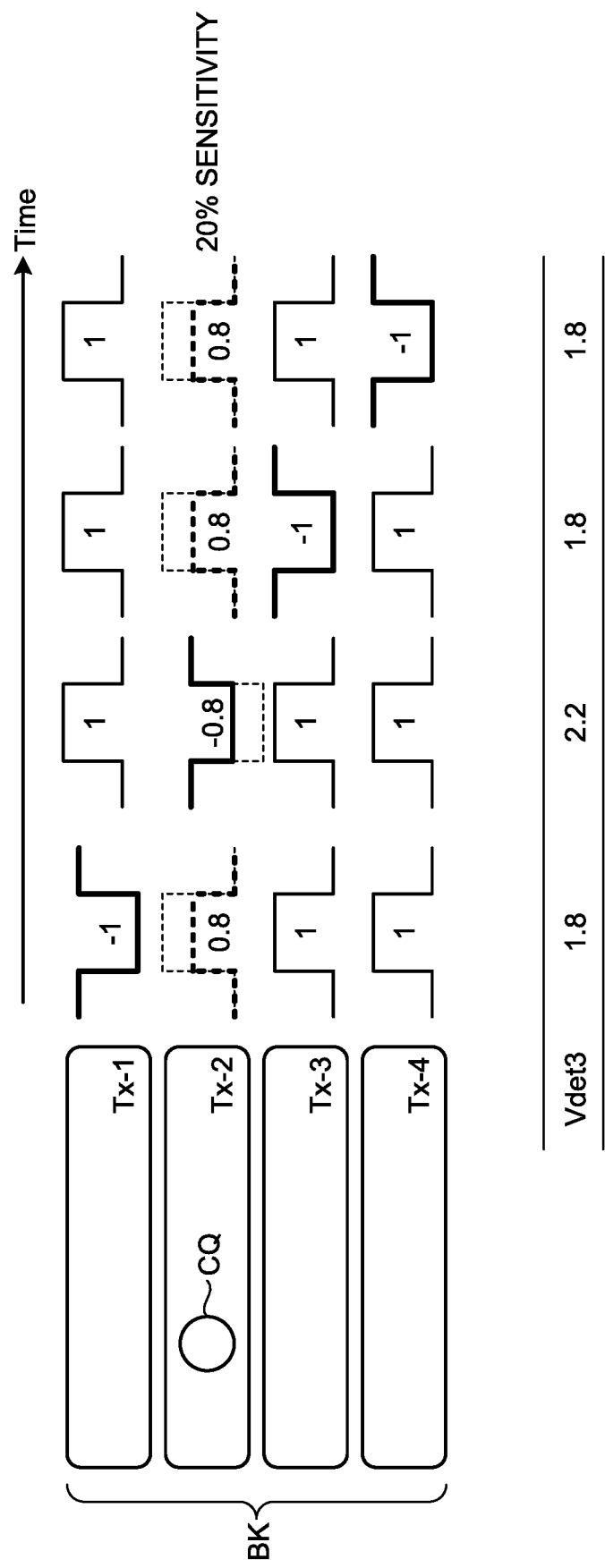
FIG. 8 is a diagram for explaining an exemplary operation in code division multiplexing drive.

The following describes CDM drive performed by the detection apparatus 1. FIG. 8 is a diagram for explaining an exemplary operation in code division multiplexing drive. To simplify the explanation, FIG. 8 illustrates an exemplary operation in CDM drive performed on four first electrodes Tx-1, Tx-2, Tx-3, and Tx-4. As illustrated in FIG. 8, the first selection circuit 12, the second selection circuit 13, and the third selection circuit 14B select the four first electrodes Tx-1, Tx-2, Tx-3, and Tx-4 of a first electrode block BK simultaneously. The third selection circuit 14B supplies the drive signals Vc having the phases determined based on a predetermined code to the respective first electrodes Tx. The predetermined code is defined by the square matrix in Expression (1), for example. The order of the square matrix is four, which is equal to the number of first electrodes Tx-1, Tx-2, Tx-3, and Tx-4. Diagonal elements "−1" of the square matrix in Expression (1) are different from elements "1" other than the diagonal elements of the square matrix. The third selection circuit 14B applies the drive signals Vc such that the phase of AC rectangular waves corresponding to the elements "1" other than the diagonal elements of the square matrix is opposite to the phase of AC rectangular waves corresponding to the diagonal elements "−1" of the square matrix based on the square matrix in Expression (1). The element "−1" is an element for supplying the drive signal Vc determined to have a phase different from that of the element "1".

$$\begin{pmatrix} -1 & 1 & 1 & 1 \\ 1 & -1 & 1 & 1 \\ 1 & 1 & -1 & 1 \\ 1 & 1 & 1 & -1 \end{pmatrix} \begin{pmatrix} 1.8 \\ 2.2 \\ 1.8 \\ 1.8 \end{pmatrix} = \begin{pmatrix} 4.0 \\ 3.2 \\ 4.0 \\ 4.0 \end{pmatrix} \quad (1)$$

If an external proximity object CQ, such as a finger, is present on the first electrode Tx-2 out of the first electrodes Tx-1, Tx-2, Tx-3, and Tx-4, a voltage of difference due to the external proximity object CQ is generated by mutual induction (the voltage of difference is 20%, for example). In the example illustrated in FIG. 8, the third detection signal Vdet3, which is obtained by integrating the first detection signal Vdet1 corresponding to the element "1" and the second detection signal Vdet2 corresponding to the element "−1", is output from the second electrode Rx. The third detection signal Vdet3 detected by the detector 40 in the first period of time is calculated by: (−1)+(0.8)+(1)+(1)=1.8. The third detection signal Vdet3 in the second period of time is calculated by: (1)+(−0.8)+(1)+(1)=2.2. The third detection signal Vdet3 in the third period of time is calculated by: (1)+(0.8)+(−1)+(1)=1.8. The third detection signal Vdet3 in the fourth period of time is calculated by: (1)+(0.8)+(1)+(−1)=1.8.

The signal processor 44 stores the third detection signals Vdet3 detected in the respective periods of time in the storage 46. The signal processor 44 multiplies the third detection signals Vdet3 by the square matrix in Expression (1), thereby performing decoding. As a result, the signal processor 44 calculates Vdet4="4.0, 3.2, 4.0, 4.0" as a decoded signal Vdet4. The detector 40 can detect the presence of the external proximity object CQ, such as a finger, at the position of the first electrode Tx-2 based on the decoded signal Vdet4. As described above, the detection apparatus 1 detects the external proximity object CQ with detection sensitivity four times the detection sensitivity in time division multiplexing (TDM) drive without raising the voltage. The coordinate extractor 45 outputs the touch panel coordinates as the sensor output Vo.

Figure 9:
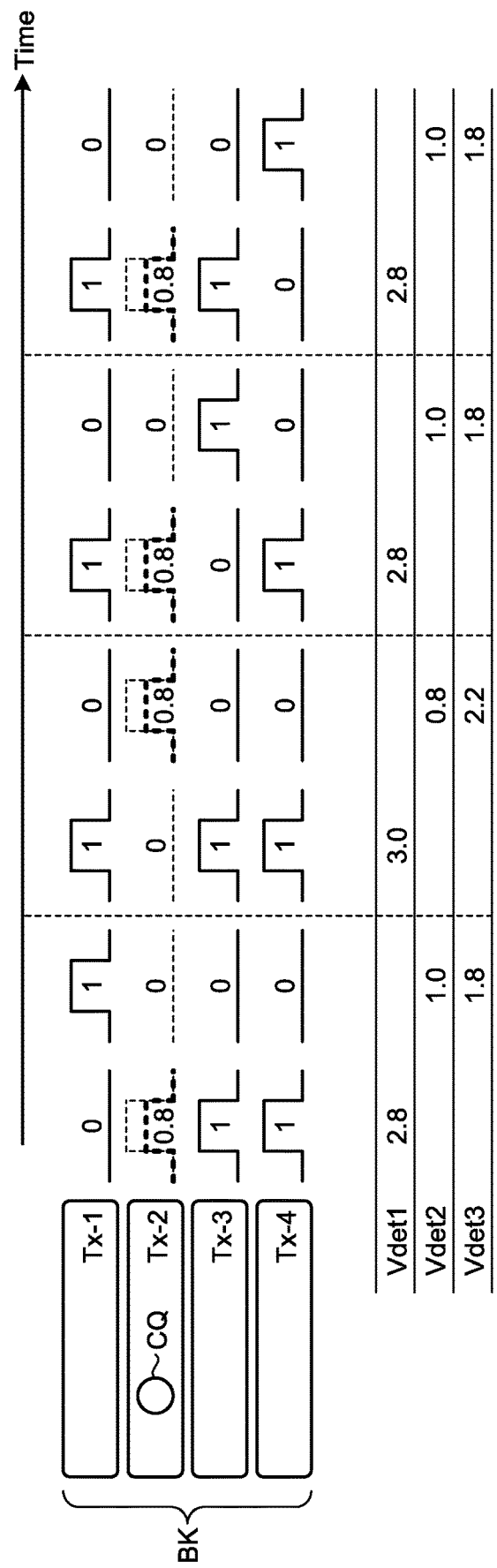
FIG. 9 is a diagram for explaining another exemplary operation in code division multiplexing drive.

FIG. 9 is a diagram for explaining another exemplary operation in code division multiplexing drive. In FIG. 9, the drive signals Vc are applied to the first electrodes Tx corresponding to the elements "1" of the square matrix and the first electrodes Tx corresponding to the elements "−1" of the square matrix in different periods of time. In this case, the phase of the AC rectangular waves corresponding to the elements "1" of the square matrix is the same as that of the AC rectangular waves corresponding to the elements "−1" of the square matrix. Specifically, in the first, the third, the fifth, and the seventh periods of time, the first selection circuit 12, the second selection circuit 13, and the third selection circuit 14B supply the drive signals Vc to the first electrodes Tx corresponding to the elements "1". In the periods of time described above, the first selection circuit 12, the second selection circuit 13, and the third selection circuit 14B supply no drive signal Vc to the first electrodes Tx corresponding to the elements "−1". By contrast, in the second, the fourth, the sixth, and the eighth periods of time, the first selection circuit 12, the second selection circuit 13, and the third selection circuit 14B supply no drive signal Vc to the first electrodes Tx corresponding to the elements "1"

but supply the drive signals Vc to the first electrodes Tx corresponding to the elements "−1".

The signal processor 44 calculates the difference between the first detection signal Vdet1=2.8 detected in the first period of time and the second detection signal Vdet2=1.0 detected in the second period of time as the third detection signal Vdet3=1.8. The signal processor 44 calculates the difference between the first detection signal Vdet1=3.0 detected in the third period of time and the second detection signal Vdet2=0.8 detected in the fourth period of time as the third detection signal Vdet3=2.2. The signal processor 44 performs the same operation as described above in and after the fifth period of time. The signal processor 44 decodes the calculated third detection signals Vdet3, thereby calculating Vdet4="4.0, 3.2, 4.0, 4.0" as the decoded signal Vdet4.

If several hundred to one thousand or more first electrodes Tx are provided at a small array pitch, for example, the size of the circuits that supply the selection signals and the drive signals resulting from the predetermined code may possibly increase. In a method of sequentially transmitting the selection signals to the first electrodes Tx via shift registers or the like, the detection performance may possibly be degraded because of delay of the signals, for example.

Figure 10:
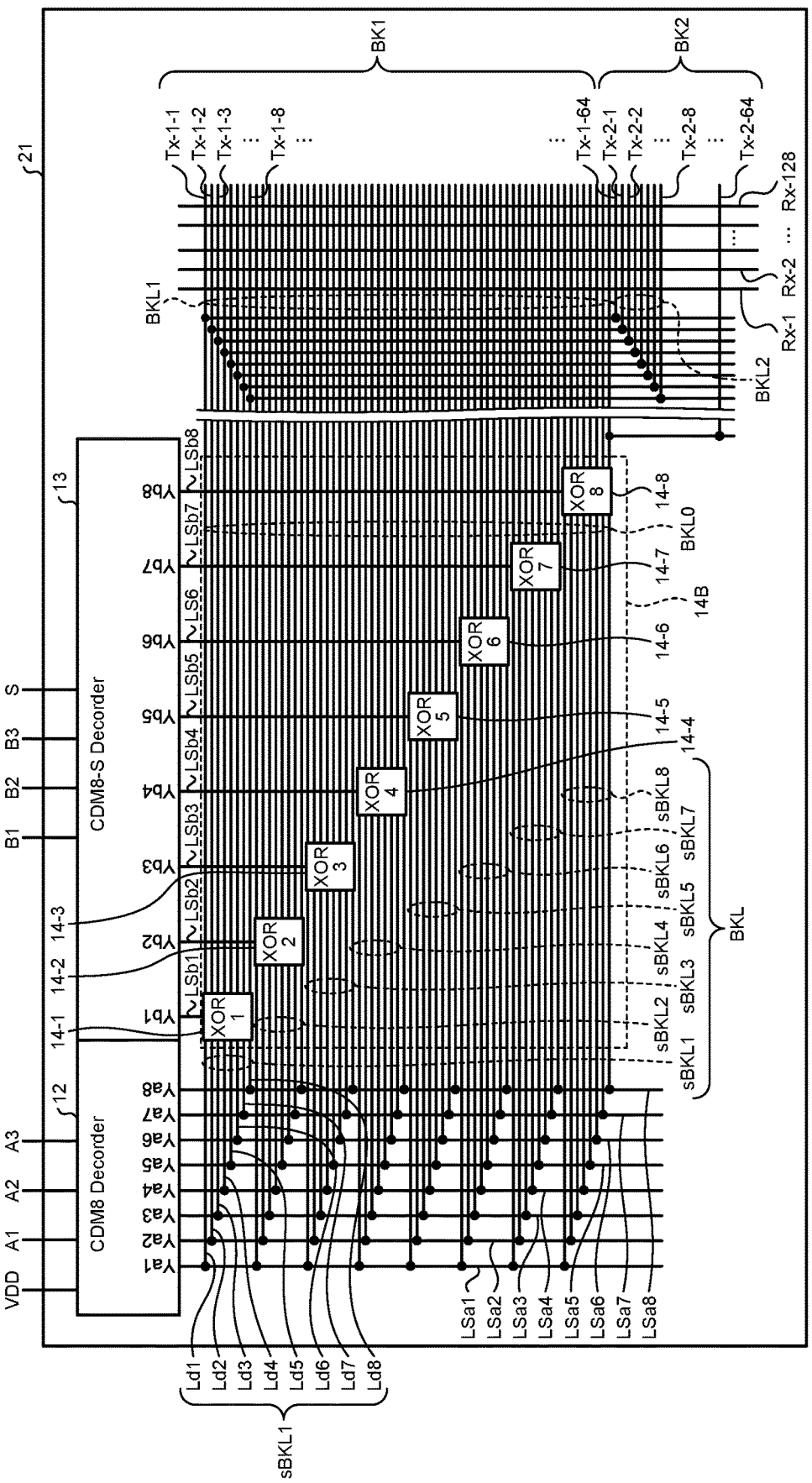
FIG. 10 is a block diagram of a first selection circuit, a second selection circuit, and a third selection circuit according to the first embodiment.

FIG. 10 is a block diagram of the first selection circuit, the second selection circuit, and the third selection circuit according to the first embodiment. As illustrated in FIG. 10, the first selection circuit 12, the second selection circuit 13, and the third selection circuit 14B are provided on the sensor substrate 21. The first selection circuit 12 includes first input terminals A1, A2, and A3, a power source voltage terminal VDD, and first output terminals Ya1, Ya2, Ya3, Ya4, Ya5, Ya6, Ya7, and Ya8. In the following description, the first output terminals Ya1, Ya2, Ya3, Ya4, Ya5, Ya6, Ya7, and Ya8 are simply referred to as first output terminals Ya when they need not be distinguished from one another. In the configuration according to the present embodiment, the number P of first output terminals Ya serving as output terminals of the first selection circuit 12 is eight. The first input terminals A1, A2, and A3 receive the first control signals Va1, Va2, and Va3, respectively, from the detection controller 11 (refer to FIG. 3). The first selection circuit 12 provides the first selection signals Vd based on the first control signals Va1, Va2, and Va3. The first output terminals Ya output the first selection signals Vd to respective first selection signal lines LSa1, LSa2, . . . , and LSa8.

The second selection circuit 13 includes second input terminals B1, B2, B3, and S and second output terminals Yb1, Yb2, Yb3, Yb4, Yb5, Yb6, Yb7, and Yb8. In the following description, the second output terminals Yb1, Yb2, Yb3, Yb4, Yb5, Yb6, Yb7, and Yb8 are simply referred to as second output terminals Yb when they need not be distinguished from one another. In the configuration according to the present embodiment, the number Q of second output terminals Yb serving as output terminals of the second selection circuit 13 is eight. The second input terminals B1, B2, and B3 receive the second control signals Vb1, Vb2, and Vb3, respectively, from the detection controller 11 (refer to FIG. 3). The second input terminal S receives the inversion control signal Vs from the detection controller 11. The second selection circuit 13 provides the second selection signals Vf based on the second control signals Vb1, Vb2, and Vb3 and the inversion control signal Vs. The inversion control signal Vs is a signal for inverting the elements "1" and "−1" of the predetermined code. The second output terminals Yb output the second selection signals Vf to respective second selection signal lines LSb1, LSb2, and LSb8.

As illustrated in FIG. 10, a plurality of first electrode blocks BK each including a plurality of first electrodes Tx-1, Tx-2, Tx-3, . . . , and Tx-64 are provided. In the configuration according to the present embodiment, the number N of first electrodes Tx included in one first electrode block BK is 64. Drive signal supply lines Ld1, Ld2, . . . , and Ld64 are coupled to the respective first electrodes Tx. Drive signal supply line partial blocks sBKL1, sBKL2, sBKL3, sBKL4, sBKL5, sBKL6, sBKL7, and sBKL8 each include eight drive signal supply lines Ld the number of which corresponds to the number Q of second output terminals Yb. The first electrode block BK is coupled to a drive signal supply line block BKL. The drive signal supply line block BKL includes eight drive signal supply line partial blocks sBKL the number of which corresponds to the number Q of second output terminals Yb.

The first selection signal lines LSa1, LSa2, . . . , and LSa8 are coupled to the respective drive signal supply lines Ld in each of the drive signal supply line partial blocks sBKL. As a result, the first selection signal lines LSa1, LSa2, . . . , and LSa8 are coupled to the drive signal supply line partial blocks sBKL1, sBKL2, sBKL3, sBKL4, sBKL5, sBKL6, sBKL7, and sBKL8 in parallel. The first selection signal lines LSa1, LSa2, . . . , and LSa8 are coupled to different drive signal supply lines Ld. In other words, the drive signal supply lines Ld included in one drive signal supply line partial block sBKL are coupled to the respective first selection signal lines LSa1, LSa2, . . . , and LSa8. The drive signal supply lines Ld1, Ld2, . . . , and Ld8 included in the drive signal supply line partial block sBKL1, for example, are coupled to the first selection signal lines LSa1, LSa2, . . . , and LSa8, respectively. The drive signal supply line partial blocks sBKL2, sBKL3, . . . , and sBKL8 have the same configuration as described above.

Third selection circuits 14-1, 14-2, . . . , and 14-8 are provided corresponding to the drive signal supply line partial blocks sBKL1, sBKL2, sBKL3, . . . , and sBKL8, respectively. The second selection signal lines LSb1, LSb2, . . . , and LSb8 are coupled to the third selection circuits 14-1, 14-2, . . . , and 14-8, respectively. In other words, the second selection signal lines LSb1, LSb2, . . . , and LSb8 are coupled to the drive signal supply line partial blocks sBKL1, sBKL2, and sBKL8, respectively. One third selection circuit 14 is coupled to a plurality of first selection signal lines LSa1, LSa2, . . . , and LSa8 and to one second selection signal line Yb. To simplify the explanation, the third selection circuit 14B illustrated in FIG. 10 are divided into the third selection circuits 14-1, 14-2, . . . , and 14-8 corresponding to the respective drive signal supply line partial blocks sBKL. The third selection circuits 14-1, 14-2, . . . , and 14-8 may be provided as one circuit. A drive signal supply line block BKL0 corresponds to a plurality of drive signal supply line partial blocks sBKL. The drive signal supply line block BKL0 is coupled to a plurality of drive signal supply line blocks BKL1, BKL2, . . . , and BKLn. The drive signal supply line blocks BKL1, BKL2, . . . , and BKLn correspond to the first electrode blocks BK1, . . . , and BKn, respectively. With this configuration, the third selection circuit 14B outputs the same signals to the first electrode blocks BK.

Figure 11:
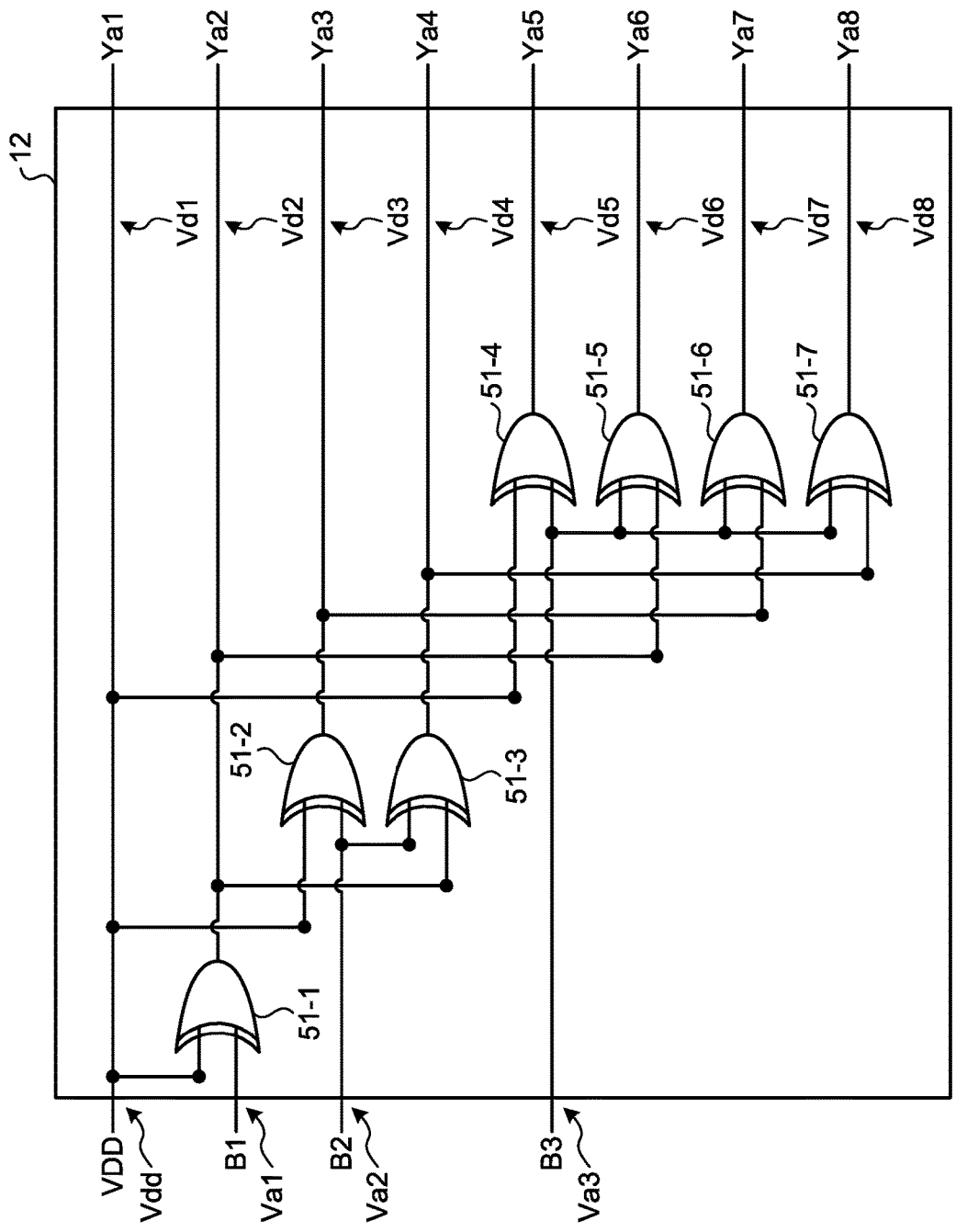
FIG. 11 is a circuit diagram of an example of the first selection circuit.
Figure 12:
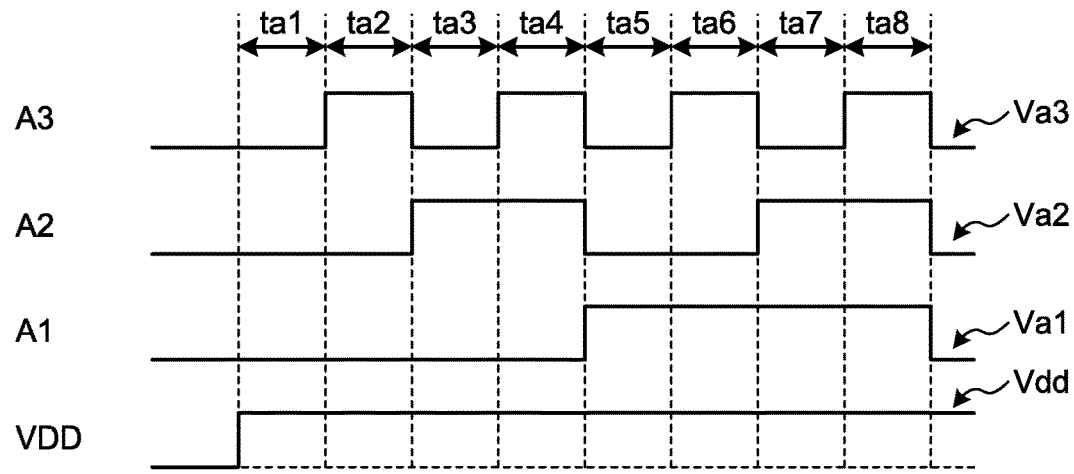
FIG. 12 is a timing waveform chart of an example of first control signals.
Figure 13:
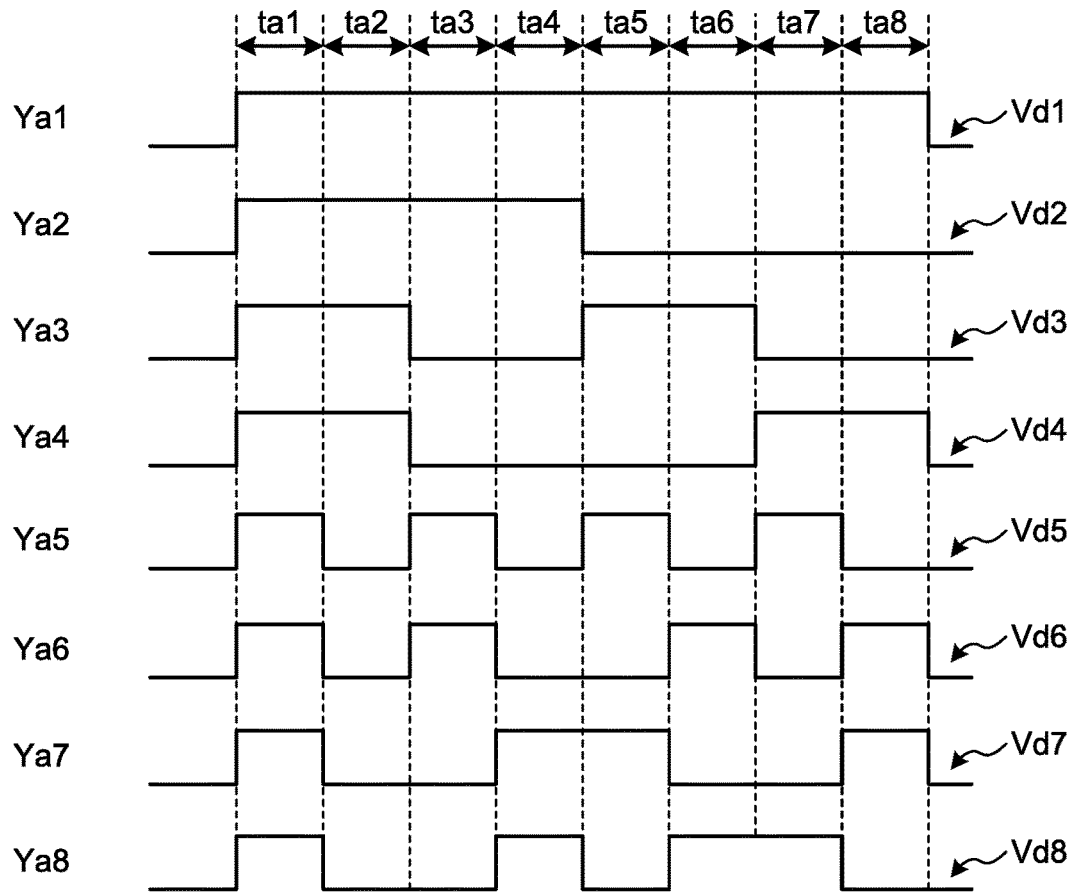
FIG. 13 is a timing waveform chart of an example of first selection signals.

The following describes the operations performed by the first selection circuit 12, the second selection circuit 13, and the third selection circuit 14. FIG. 11 is a circuit diagram of an example of the first selection circuit. FIG. 12 is a timing waveform chart of an example of the first control signals. FIG. 13 is a timing waveform chart of an example of the first selection signals. FIG. 14 is a table indicating the relation between the first control signals and the first selection signals.

As illustrated in FIG. 11, the first selection circuit 12 includes a plurality of XOR circuits 51-1, 51-2, ..., and 51-7. The XOR circuits 51-1, 51-2, ..., and 51-7 receive any one of the first control signals Va1, Va2, and Va3 and the power source voltage Vdd or an output signal from another XOR circuit 51. The XOR circuits 51-1, 51-2, ..., and 51-7 output the value of exclusive or (Xor) of the received signals as first selection signals Vd2, Vd3, ..., and Vd8, respectively. The same signal as the power source voltage Vdd is output as a first selection signal Vd1.

As illustrated in FIG. 12, the first control signals Va1, Va2, and Va3 are switched on (high-level voltage) and off (low-level voltage) in each of periods ta1, ta2, ..., and ta8. The first control signals Va1, Va2, and Va3 are voltage signals generated based on clock signals from the clock signal output unit 11b and are output signals from a binary counter circuit, for example. Specifically, the first control signal Va3 is turned on in the period ta2. At a falling timing of the first control signal Va3, the first control signal Va2 is turned on. The frequency of the first control signal Va2 is one half the frequency of the first control signal Va3. In the periods ta3 and ta4, the first control signal Va2 remains on. At a falling timing of the first control signal Va2, the first control signal Va1 is turned on. The frequency of the first control signal Va1 is one half the frequency of the first control signal Va2. In the periods ta5 to ta8, the first control signal Va1 remains on. When all of the first control signals Va1, Va2, and Va3 are turned on, the operation is reset, and the first selection circuit 12 repeats the operation from the period ta1 to the period ta8.

The first selection circuit 12 provides the first selection signals Vd1, Vd2, ..., and Vd8 illustrated in FIG. 13 based on the first control signals Va1, Va2, and Va3 and the power source voltage Vdd illustrated in FIG. 12. The first selection signals Vd1, Vd2, ..., and Vd8 are output from the respective first output terminals Ya in each of the periods ta1, ta2, ..., and ta8. The combination patterns of turning-on and -off of the first selection signals Vd1, Vd2, ..., and Vd8 are different from one another between the periods ta1, ta2, ..., and ta8. The number of combination patterns of turning-on and -off of the first selection signals Vd1, Vd2, ..., and Vd8 is eight, which is equal to the number of first output terminals Ya.

The first selection circuit 12 provides the first selection signals Vd1, Vd2, ..., and Vd8 corresponding to the first control signals Va1, Va2, and Va3 and the power source voltage Vdd according to the truth table illustrated in FIG. 14. In FIG. 14, "1" is allocated if the signals are at a high-level voltage, and "0" is allocated if the signals are at a low-level voltage. The first selection circuit 12 thus outputs the first selection signals Vd1, Vd2, ..., and Vd8 having the phases determined based on a predetermined code to the drive signal supply line partial blocks sBKL. The predetermined code is defined by the square matrix in Expression (2), for example. The order of the square matrix is eight, which is equal to the number of first output terminals Ya. The predetermined code is a square matrix the elements of which are either "1" or "−1" or "1" or "0" and certain two different rows of which are an orthogonal matrix. The predetermined code is based on a Hadamard matrix, for example.

$$\begin{pmatrix} 1 & 1 & 1 & 1 & 1 & 1 & 1 & 1 \\ 1 & 1 & 1 & 1 & -1 & -1 & -1 & -1 \\ 1 & 1 & -1 & -1 & 1 & 1 & -1 & -1 \\ 1 & 1 & -1 & -1 & -1 & -1 & 1 & 1 \\ 1 & -1 & 1 & -1 & 1 & -1 & 1 & -1 \\ 1 & -1 & 1 & -1 & -1 & 1 & -1 & 1 \\ 1 & -1 & -1 & 1 & 1 & -1 & -1 & 1 \\ 1 & -1 & -1 & 1 & -1 & 1 & 1 & -1 \end{pmatrix} \quad (2)$$

Figure 15:
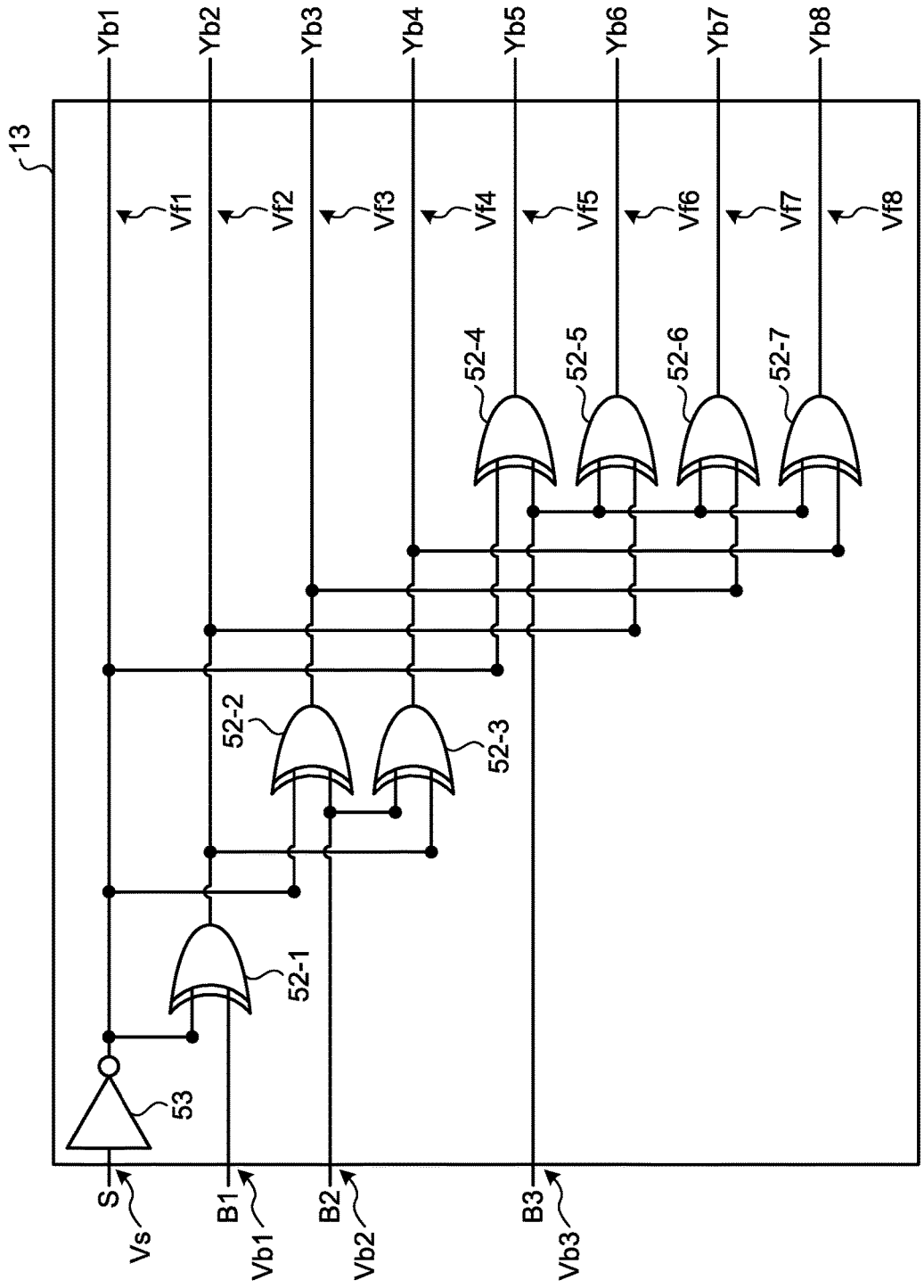
FIG. 15 is a circuit diagram of an example of the second selection circuit.
Figure 16:
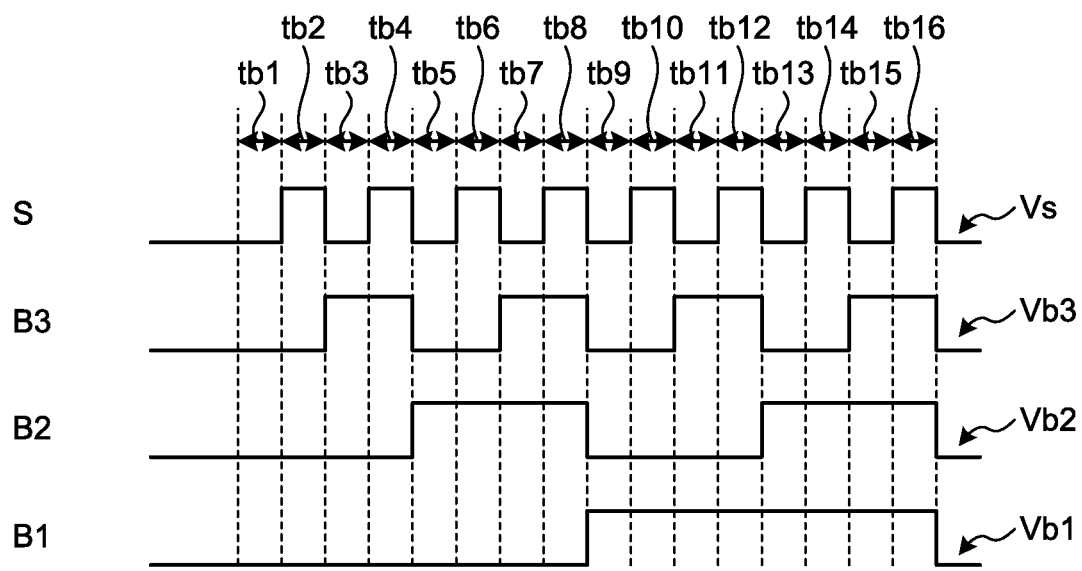
FIG. 16 is a timing waveform chart of an example of second control signals and an inversion control signal.
Figure 17:
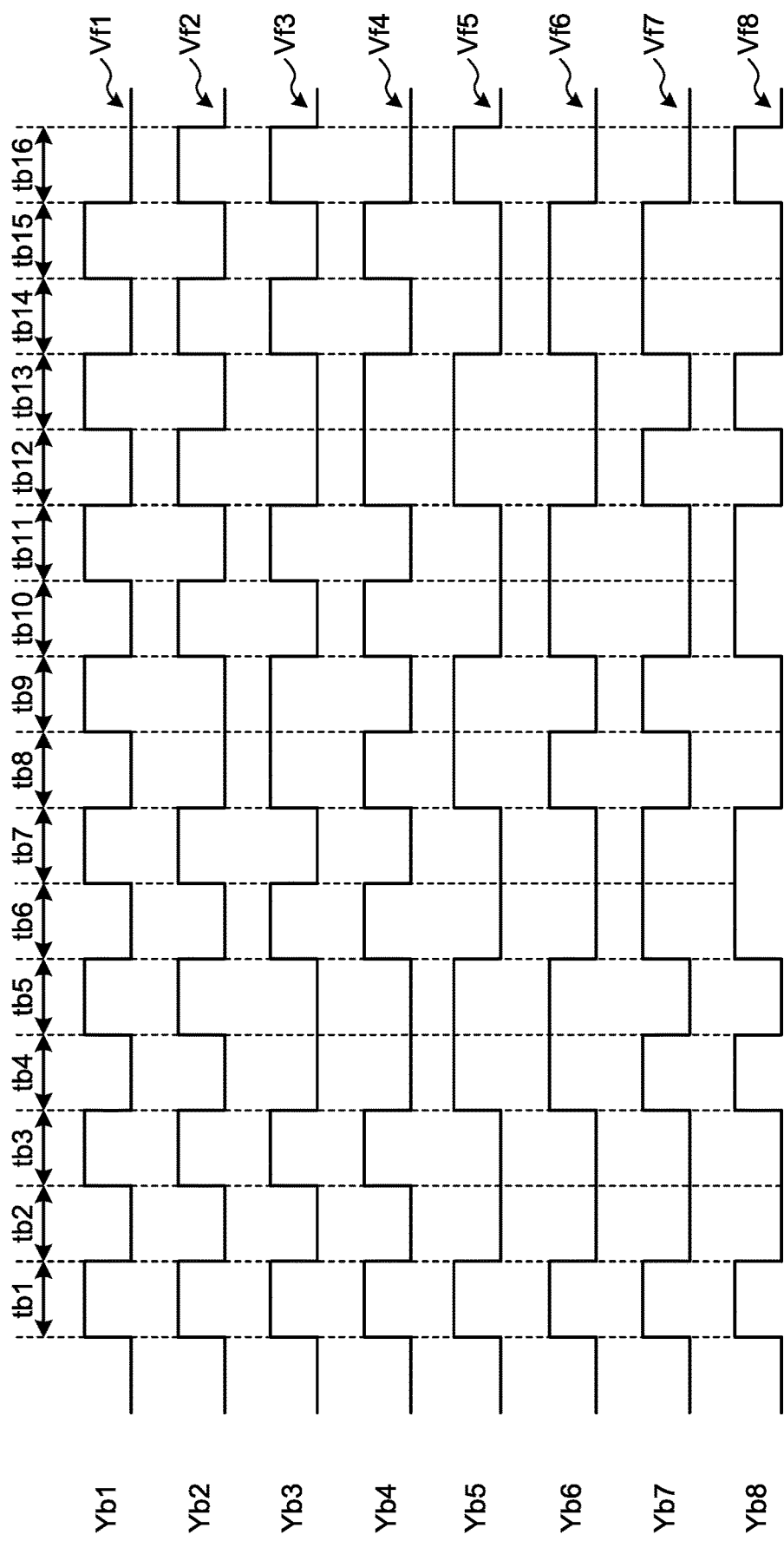
FIG. 17 is a timing waveform chart of an example of second selection signals.

FIG. 15 is a circuit diagram of an example of the second selection circuit. FIG. 16 is a timing waveform chart of an example of the second control signals and the inversion control signal. FIG. 17 is a timing waveform chart of an example of the second selection signals. FIG. 18 is a table indicating the relation between the second control signals and the inversion control signal, and the second selection signals.

As illustrated in FIG. 15, the second selection circuit 13 includes a plurality of XOR circuits 52-1, 52-2, ..., and 52-7 and an inverter 53. The inverter 53 outputs a voltage signal obtained by inverting the inversion control signal Vs as a second selection signal Vf1. In other words, the inverter 53 outputs a low-level voltage signal if the inversion control signal Vs is at a high-level voltage and outputs a high-level voltage signal if the inversion control signal Vs is at a low-level voltage. The XOR circuits 52-1, 52-2, ..., and 52-7 receive any one of the second control signals Vb1, Vb2, and Vb3 and an output signal from the inverter 53 or an output signal from another XOR circuit 52. The XOR circuits 52-1, 52-2, ..., and 52-7 output the value of Xor of the received signals as the second selection signals Vf2, Vf3, ..., and Vf8, respectively. The inverter 53 is not necessarily provided, and the second selection circuit 13 may output the inversion control signal Vs as the second selection signal Vf1.

As illustrated in FIG. 16, the inversion control signal Vs and the second control signals Vb1, Vb2, and Vb3 are switched on (high-level voltage) and off (low-level voltage) in each of periods tb1, tb2, ..., and tb8. The inversion control signal Vs and the second control signals Vb1, Vb2, and Vb3 are voltage signals generated based on clock signals from the clock signal output unit 11b. The inversion control signal Vs and the second control signals Vb1, Vb2, and Vb3 are output signals from a binary counter circuit, for example, similarly to the first control signals Va1, Vat, and Va3. Specifically, the inversion control signal Vs is turned on in the period tb2. At a falling timing of the inversion control signal Vs, the second control signal Vb3 is turned on. The frequency of the second control signal Vb3 is one half the frequency of the inversion control signal Vs. In the periods tb3 and tb4, the second control signal Vb3 remains on. At a falling timing of the second control signal Vb3, the second control signal Vb2 is turned on. The frequency of the second control signal Vb2 is one half the frequency of the second control signal Vb3. In the periods tb5 to tb8, the second control signal Vb2 remains on. At a falling timing of the second control signal Vb2, the second control signal Vb1 is turned on. The frequency of the second control signal Vb1 is one half the frequency of the second control signal Vb2. In the periods tb9 to tb16, the second control signal Vb1 remains on. When all of the inversion control signal Vs and the second control signals Vb1, Vb2, and Vb3 are turned on, the operation is reset, and the second selection circuit 13 repeats the operation from the period tb1 to the period tb16.

The second selection circuit 13 provides the second selection signals Vf1, Vf2, . . . , and Vf8 illustrated in FIG. 17 based on the inversion control signal Vs and the second control signals Vb1, Vb2, and Vb3 illustrated in FIG. 16. The second selection signals Vf1, Vf2, . . . , and Vf8 are output from the respective second output terminals Yb in each of the periods tb1, tb2, . . . , and tb16. The combination patterns of turning-on and -off of the second selection signals Vf1, Vf2, . . . , and Vf8 are different from one another between the periods tb1, tb2, . . . , and tb16. The number of combination patterns of turning-on and -off of the second selection signals Vf1, Vf2, . . . , and Vf8 is 16, which is twice the number of second output terminals Yb.

The combination patterns described above include combination patterns obtained by inverting turning-on and -off of the second selection signals Vf1, Vf2, . . . , and Vf8 because the second selection circuit 13 receives the inversion control signal Vs. Specifically, the inversion control signal Vs is turned off in the periods tb1, tb3, tb5, tb7, tb9, tb11, tb13, and tb15, and turned on in the periods tb2, tb4, tb6, tb8, tb10, tb12, tb14, and tb16. The periods Tb1 and tb2, for example, have combination patterns of turning-on and -off of the second selection signals Vf1, Vf2, . . . , and Vf8 opposite to each other. Similarly, each pair of periods from the period tb3 to the period tb16 also has combination patterns opposite to each other.

The second selection circuit 13 provides the second selection signals Vf corresponding to the second control signals Vb1, Vb2, and Vb3 and the inversion control signal Vs according to the truth table illustrated in FIG. 18. In FIG. 18, "1" is allocated if the signals are at a high-level voltage, and "0" is allocated if the signals are at a low-level voltage. The second selection circuit 13 thus outputs the second selection signals Vf1, Vf2, . . . , and Vf8 having the phases determined based on a predetermined code to the respective drive signal supply line partial blocks sBKL. The predetermined code is defined by the square matrix in Expression (2), for example. If the inversion control signal Vs is turned off ("0"), the second selection circuit 13 provides the second selection signals Vf1, Vf2, . . . , and Vf8 corresponding to the elements "1" in the square matrix. If the inversion control signal Vs is turned on ("1"), the second selection circuit 13 provides the second selection signals Vf1, Vf2, . . . , and Vf8 corresponding to the elements "−1" in the square matrix. The order of the square matrix is eight, which is equal to the number of second output terminals Yb.

Figure 19:
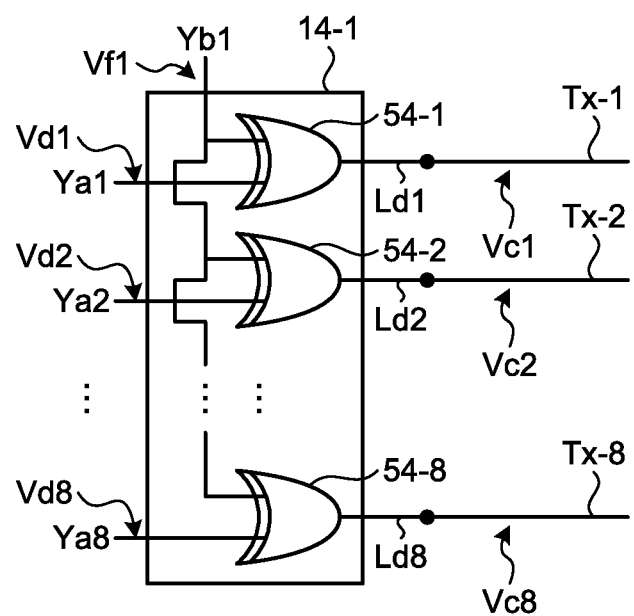
FIG. 19 is a circuit diagram of an example of the third selection circuit.
Figure 20:
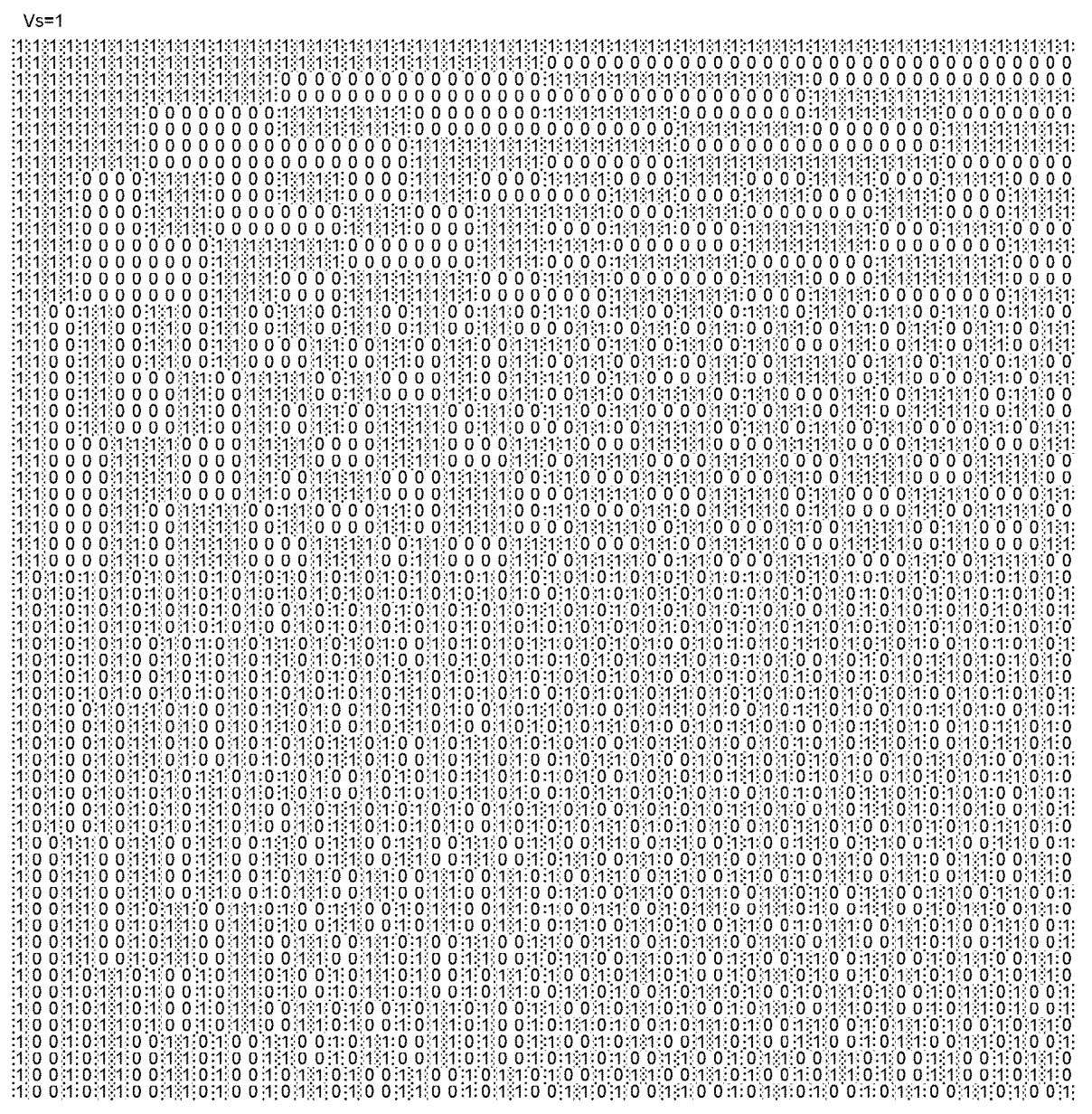
Figure 21:
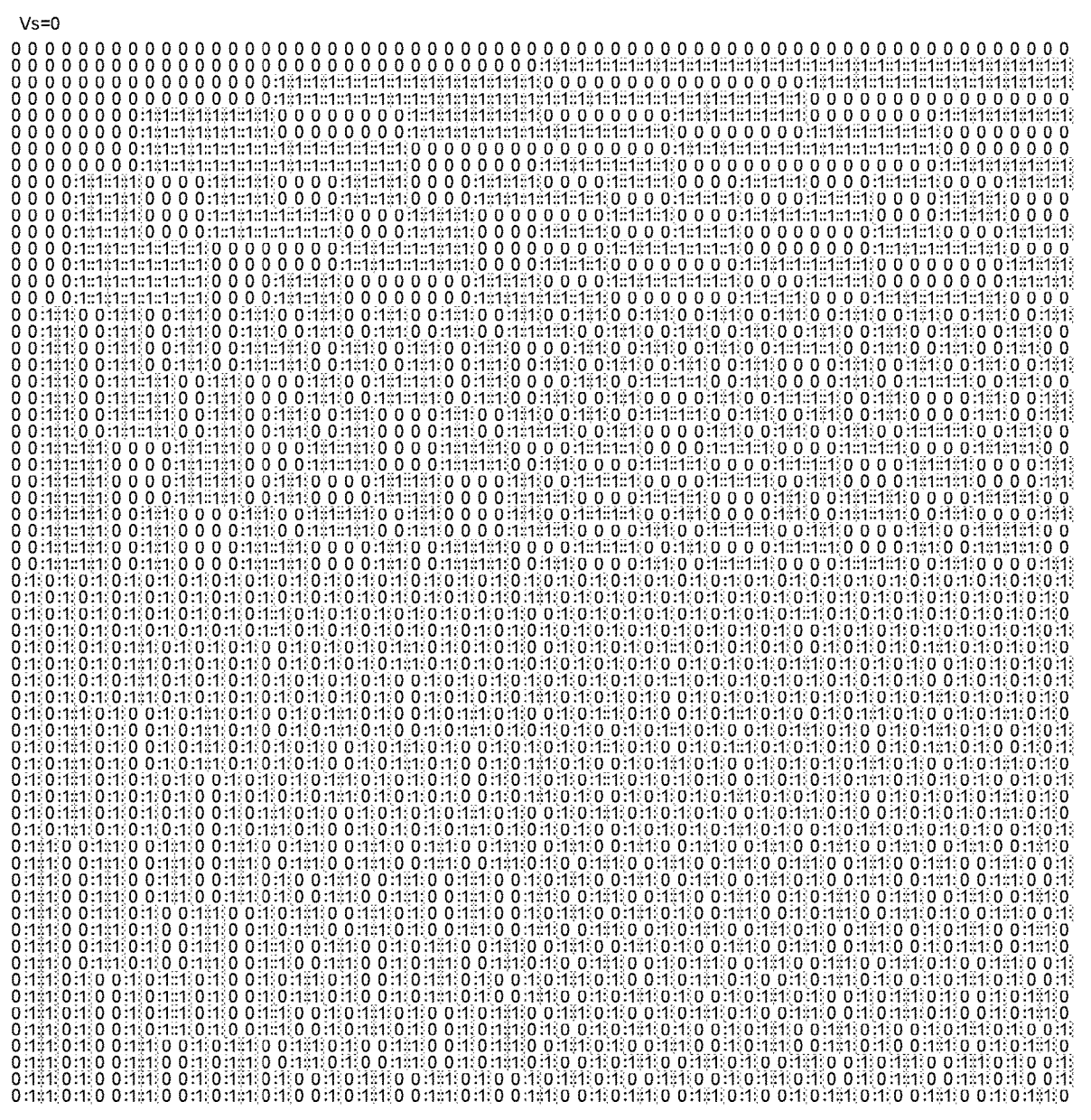

FIG. 19 is a circuit diagram of an example of the third selection circuit. FIG. 20 illustrates an example of a pattern code generated by the third selection circuit if the inversion control signal is at a high-level voltage. FIG. 21 illustrates an example of a pattern code generated by the third selection circuit if the inversion control signal is at a low-level voltage. FIG. 22 is a table indicating the relation between the first control signals, the second control signals and the inversion control signal, and the detection signals.

FIG. 19 illustrates the third selection circuit 14-1 provided to the drive signal supply line partial block sBKL1 out of the drive signal supply line partial blocks sBKL. As illustrated in FIG. 19, the third selection circuit 14-1 includes a plurality of XOR circuits 54-1, 54-2, . . . , and 54-8. The XOR circuits 54-1, 54-2, . . . , and 54-8 receive the first selection signals Vd1, Vd2, and Vd8, respectively, from the first output terminals Ya of the first selection circuit 12. The XOR circuits 54-1, 54-2, . . . , and 54-8 also receive the second selection signal Vf1 from the second output terminal Yb1 of the second selection circuit 13. The XOR circuits 54-1, 54-2, . . . , and 54-8 calculate Xor of the first selection signals Vd1, Vd2, . . . , and Vd8, respectively, and the second selection signal Vf1. The values calculated by the XOR circuits 54-1, 54-2, . . . , and 54-8 are supplied to the first electrodes Tx-1, Tx-2, . . . , and Tx-8 via the drive signal supply lines Ld1, Ld2, . . . , and Ld8, respectively, as the drive signals Vc.

As illustrated in FIG. 10, the third selection circuits 14-2, 14-3, . . . , and 14-8 receive the second selection signals Vf2, Vf3, . . . , and Vf8 (refer to FIG. 18) from the second output terminals Yb2, Yb3, . . . , and Yb8, respectively, of the second selection circuit 13. The third selection circuits 14-2, 14-3, . . . , and 14-8 also calculate Xor of the first selection signals Vd1, Vd2, . . . , and Vd8 and the received second selection signals Vf2, Vf3, . . . , and Vf8, respectively.

As illustrated in FIG. 14, the number of combination patterns of the first selection signals Vd is eight. As illustrated in FIG. 18, the number of combination patterns of the second selection signals Vf is eight in both of the cases where the inversion control signal Vs is 0 and 1, that is, 16 in total. Consequently, as illustrated in FIG. 20, the order of the pattern code (predetermined code) of the drive signal Vc provided by the third selection circuit 14 is 8×8=64 if the inversion control signal Vs is 1. Similarly, as illustrated in FIG. 21, the order of the pattern code of the drive signal Vc provided by the third selection circuit 14 is 8×8=64 if the inversion control signal Vs is 0. The pattern code illustrated in FIG. 21 is obtained by inverting "0" and "1" in the pattern code illustrated in FIG. 20.

The first selection circuit 12, the second selection circuit 13, and the third selection circuit 14 generate drive signals Vc1, . . . , and Vc64 corresponding to the pattern codes illustrated in FIGS. 20 and 21 according to the truth table illustrated in FIG. 22. The drive signals Vc1, and Vc64 are substantially simultaneously supplied to the first electrodes Tx-1 to Tx-64, respectively. As illustrated in FIG. 22, if the inversion control signal Vs is 1, the second electrodes Rx output the first detection signals Vdet1. If the inversion control signal Vs is 0, the second electrodes Rx output the second detection signals Vdet2. The number of first detection signals Vdet1 and the number of second detection signals Vdet2 are 64 each, which corresponds to the order of the respective pattern codes. The signal processor 44 calculates the differences between the first detection signals Vdet1 and the second detection signals Vdet2. As a result, 64 third detection signals Vdet3 are calculated. The signal processor 44 decodes the third detection signals Vdet3 based on the predetermined code corresponding to the pattern codes illustrated in FIGS. 20 and 21. Based on the decoded signals Vdet4 calculated by the signal processor 44, the detection apparatus 1 can detect contact or proximity of the external proximity object CQ.

As illustrated in FIG. 22, the detection apparatus 1 alternately performs the processing in the periods when the inversion control signal Vs is 1 and the processing in the periods when the inversion control signal Vs is 0. As a result, the interval between the detection times for the first detection signal Vdet1 and the second detection signal Vdet2 is shortened. If noise components enter from the outside, calculating the difference between the first detection signal Vdet1 and the second detection signal Vdet2 can cancel the noise components. Consequently, the detection apparatus 1 can increase the detection accuracy.

The order of combinations of the first selection signals Vd and the second selection signals Vf is not limited to that illustrated in FIG. 22. For example, the detection apparatus 1 may successively perform the processing in a plurality of periods when the inversion control signal Vs is 1 and then successively perform the processing in a plurality of periods when the inversion control signal Vs is 0.

As described above, the detection apparatus 1 according to the present embodiment includes the first selection circuit 12 and the second selection circuit 13 (refer to FIG. 10). Based on the first selection signals Vd output from the first selection circuit 12 and the second selection signals Vf output from the second selection circuit 13, the detection apparatus 1 supplies, to all the first electrodes Tx, the drive signals Vc having the phases determined based on the predetermined code. The detection apparatus 1 thus performs CDM drive.

The third selection circuit 14-1 according to the present embodiment may calculate the negation of exclusive or (Xnor) of the first selection signals Vd and the second selection signal Vf1. Alternatively, the third selection circuit 14 may perform substantially the same arithmetic operation as the logical operation for Xor or Xnor. The configurations of the first selection circuit 12 and the second selection circuit 13 may be appropriately modified.

FIG. 23 is a table for explaining the relation between the number of first electrodes and the number of terminals of the first selection circuit and the second selection circuit. N is the number of first electrodes Tx. P is the number of first output terminals Ya, and Q is the number of second output terminals Yb. FIG. 23 illustrates the cases where the number N of first electrodes Tx is 16, 20, 24, 28, 32, 36, 40, 44, 48, 52, 56, 60, and 64. As illustrated in FIG. 23, the number N of first electrodes Tx satisfies N≤P×Q. More preferably, the number N of first electrodes Tx satisfies (P−1)×Q≤N≤P×Q or P×(Q−1)≤N≤P×Q. In the example illustrated in FIGS. 10 to 22, N=64 and P=Q=8 are satisfied. The present embodiment is not limited thereto, and N may be equal to or smaller than 63 or equal to or larger than 65. N may be more than several hundred, for example.

With this configuration, the number P of first output terminals Ya of the first selection circuit 12 and the number Q of second output terminals Yb of the second selection circuit 13 can be reduced. In other words, this configuration requires a smaller number of first selection signal lines LSa and second selection signal lines LSb that couple the first selection circuit 12 and the second selection circuit 13 to the first electrodes Tx. Consequently, if the arrangement interval Pt (refer to FIG. 6) of the first electrodes Tx is small, and a large number of first electrodes Tx are provided, this configuration can suppress an increase in circuit size.

N'=Ceil(log$_2$N) is satisfied, where Ceil is a ceiling function and is the smallest integer of the integers equal to or larger than log$_2$N with respect to log$_2$N. The sum of the number of first input terminals A1, A2, and A3 and the number of second input terminals B1, B2, B3, and S is equal to or smaller than (1+N'). In the configuration according to the present embodiment, N'=6 is satisfied. The number of first input terminals A1, A2, and A3 is three, and the number of second input terminals B1, B2, B3, and S is four. In other words, the sum of the number of first input terminals A1, A2, and A3 and the number of second input terminals B1, B2, B3, and S is (1+N')=7. As described above, the present embodiment requires a smaller number of first input terminals A1, A2, and A3 of the first selection circuit 12 and a smaller number of second input terminals B1, B2, B3, and S of the second selection circuit 13. Consequently, the present embodiment can suppress an increase in circuit size. If the number of first input terminals A1, A2, and A3 and the number of second input terminals B1, B2, B3, and S are reduced, the detection apparatus 1 can perform CDM drive by the operations of the first selection circuit 12, the second selection circuit 13, and the third selection circuit 14 as described above.

M=floor(N'/2) and L=Ceil(N'/2) are satisfied, where floor is a floor function and is the largest integer of the integers equal to or smaller than (N'/2) with respect to (N'/2). The number P of first output terminals Ya is equal to or smaller than $2^M$. The number Q of second output terminals Yb is equal to or smaller than $2^L$. Third selection signals provided by the third selection circuit 14, that is, the drive signals Vc include combination patterns of the first electrodes Tx to be selected as illustrated in FIGS. 20 and 21. The number of combination patterns is $2^{N'}$.

Figure 24:
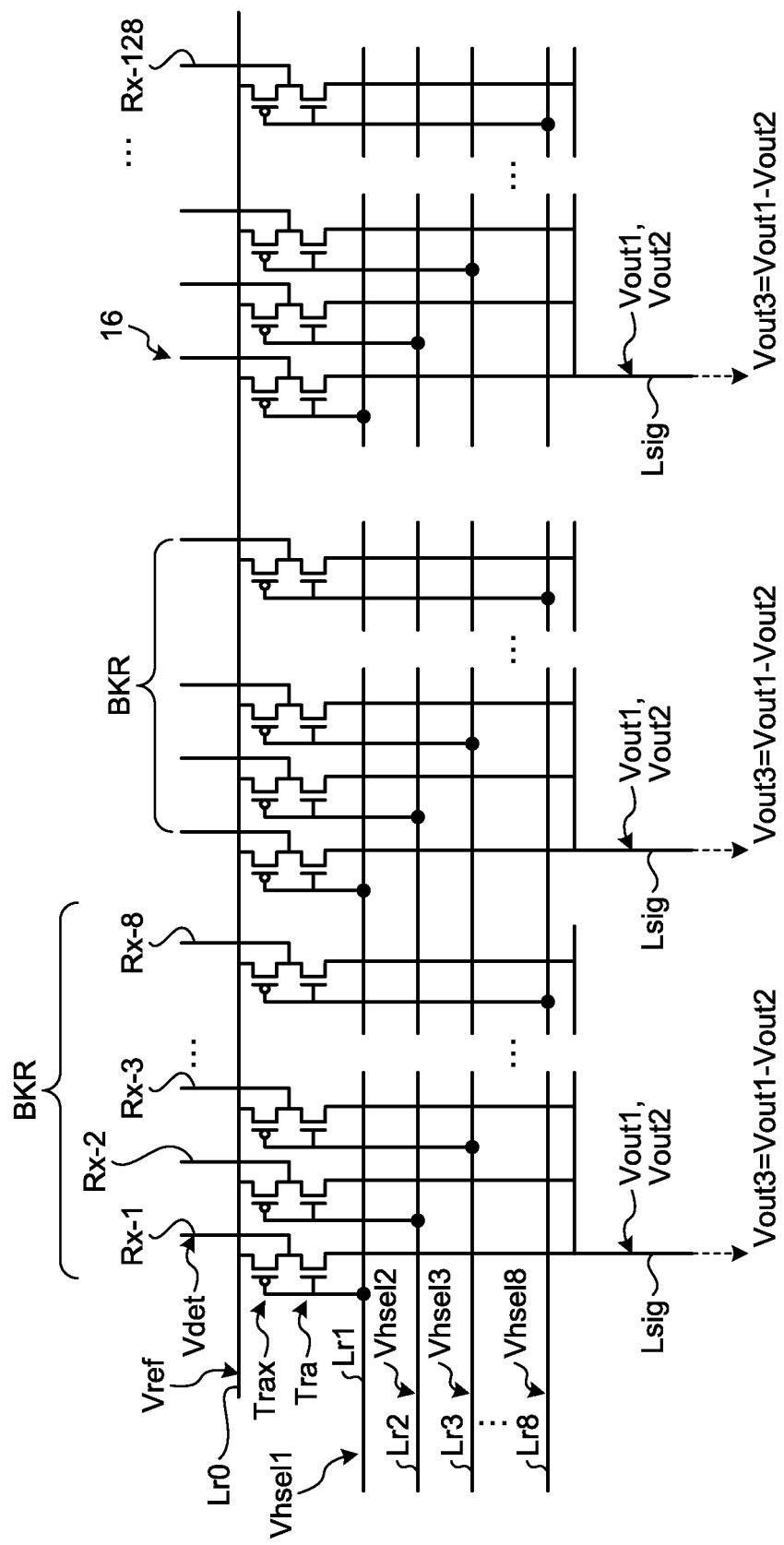
FIG. 24 is a circuit diagram of an example of a detection electrode selection circuit.

FIG. 24 is a circuit diagram of an example of the detection electrode selection circuit. As illustrated in FIG. 24, detection electrode blocks BKR each include a plurality of second electrodes Rx-1, Rx-2, . . . , and Rx-8. In FIG. 24, 128 second electrodes Rx, that is, second electrodes Rx-1 to Rx-128 are provided. The detection electrode selection circuit 16 includes first switching elements Tra, second switching elements Trax, a reference potential supply line Lr0, second electrode selection signal lines Lr1, Lr2, . . . , and Lr8, and output signal lines Lsig. The detection electrode blocks BKR are each provided with one output signal line Lsig. The output signal lines Lsig are coupled to the detector 40 (refer to FIG. 3). The detection electrode selection circuit 16 selects the second electrodes Rx to be a target of detection based on the second electrode selection signals Vhsel.

The second electrodes Rx are each coupled to the first switching element Tra and the second switching element Trax. Second electrode selection signals Vhsel1, Vhsel2, Vhsel3, . . . , and Vhsel8 are supplied to the first switching elements Tra and the second switching elements Trax via the second electrode selection signal lines Lr1, Lr2, . . . , and Lr8, respectively. When the same second electrode selection signal Vhsel is supplied, the first switching element Tra and the second switching element Trax are turned on and off in an opposite manner. In other words, if the first switching element Tra is turned on, the second switching element Trax is turned off. If the first switching element Tra is turned off, the second switching element Trax is turned on. The second electrode selection signals Vhsel can be generated based on various control signals supplied from the detection controller 11 similarly to the first selection circuit 12 illustrated in FIG. 11, for example.

The first switching element Tra and the second switching element Trax operate to switch the coupling state of the corresponding second electrode Rx included in the detection electrode block BKR to the output signal line Lsig. If the first switching element Tra is turned on, the second electrode Rx is coupled to the output signal line Lsig. If the second switching element Trax is turned on, the second electrode Rx is coupled to the reference potential supply line Lr0.

The second electrode selection signal Vhsel is a selection signal based on a predetermined code. The predetermined code is defined by the square matrix in Expression (2), for example. The second electrode selection signal Vhsel is generated by a circuit similar to the first selection circuit 12 (refer to FIG. 11) or the second selection circuit 13 (refer to FIG. 15). If the second electrode selection signal Vhsel corresponding to the elements "1" in Expression (2) is supplied, the first switching element Tra is turned on. If the second electrode selection signal Vhsel corresponding to the elements "−1" in Expression (2) is supplied, the second switching element Trax is turned on. As described above, the second electrodes Rx are selected based on the predetermined code similarly to CDM drive illustrated in FIG. 9.

Specifically, if a plurality of second electrodes Rx corresponding to the elements "1" in Expression (2) are selected, the selected second electrodes Rx are coupled to the output signal line Lsig. A first output signal Vout1 obtained by integrating the first detection signals Vdet1 (refer to FIG. 22) from the selected second electrodes Rx is output from the output signal line Lsig. Non-selected second electrodes Rx are coupled to the reference potential supply line Lr0 and supplied with a reference potential signal Vref. The reference potential signal Vref is a direct-current (DC) voltage signal having the same potential as that of the voltage signals supplied to the second electrodes Rx in detection. This mechanism can suppress capacitive coupling between the selected second electrodes Rx and the non-selected second electrodes Rx. Consequently, the present embodiment can reduce detection errors and suppress reduction in detection sensitivity.

If a plurality of second electrodes Rx corresponding to the elements "−1" in Expression (2) are selected, the selected second electrodes Rx are coupled to the output signal line Lsig. A second output signal Vout2 obtained by integrating the second detection signals Vdet2 from the selected second electrodes Rx is output from the output signal line Lsig. Non-selected second electrodes Rx are coupled to the reference potential supply line Lr0 and supplied with the reference potential signal Vref. The signal processor 44 calculates a third output signal Vout3, which is the value of difference between the first output signal Vout1 and the second output signal Vout2.

In the example represented by Expression (2), the order of the square matrix is eight, and eight combination patterns of the second electrodes Rx are obtained. In other words, eight third output signals Vout3 are obtained corresponding to the different combination patterns of the second electrodes Rx. The signal processor 44 decodes the eight third output signals Vout3 using a transpose of the square matrix in Expression (2). Based on a decoded signal Vout4 resulting from the operation, the detection apparatus 1 can detect contact or proximity of the external proximity object CQ.

The present embodiment performs CDM drive on both of the first electrodes Tx and the second electrodes Rx. Consequently, if the arrangement interval Pt of the first electrodes Tx is small, and the area of the electrode portions 23a and 23b is small, or if the width (area) of the second electrodes Rx is small, the present embodiment can increase the detection sensitivity. The number of second electrodes Rx included in the detection electrode block BKR may be seven or less or nine or more.

First Modification of the First Embodiment

Figure 25:
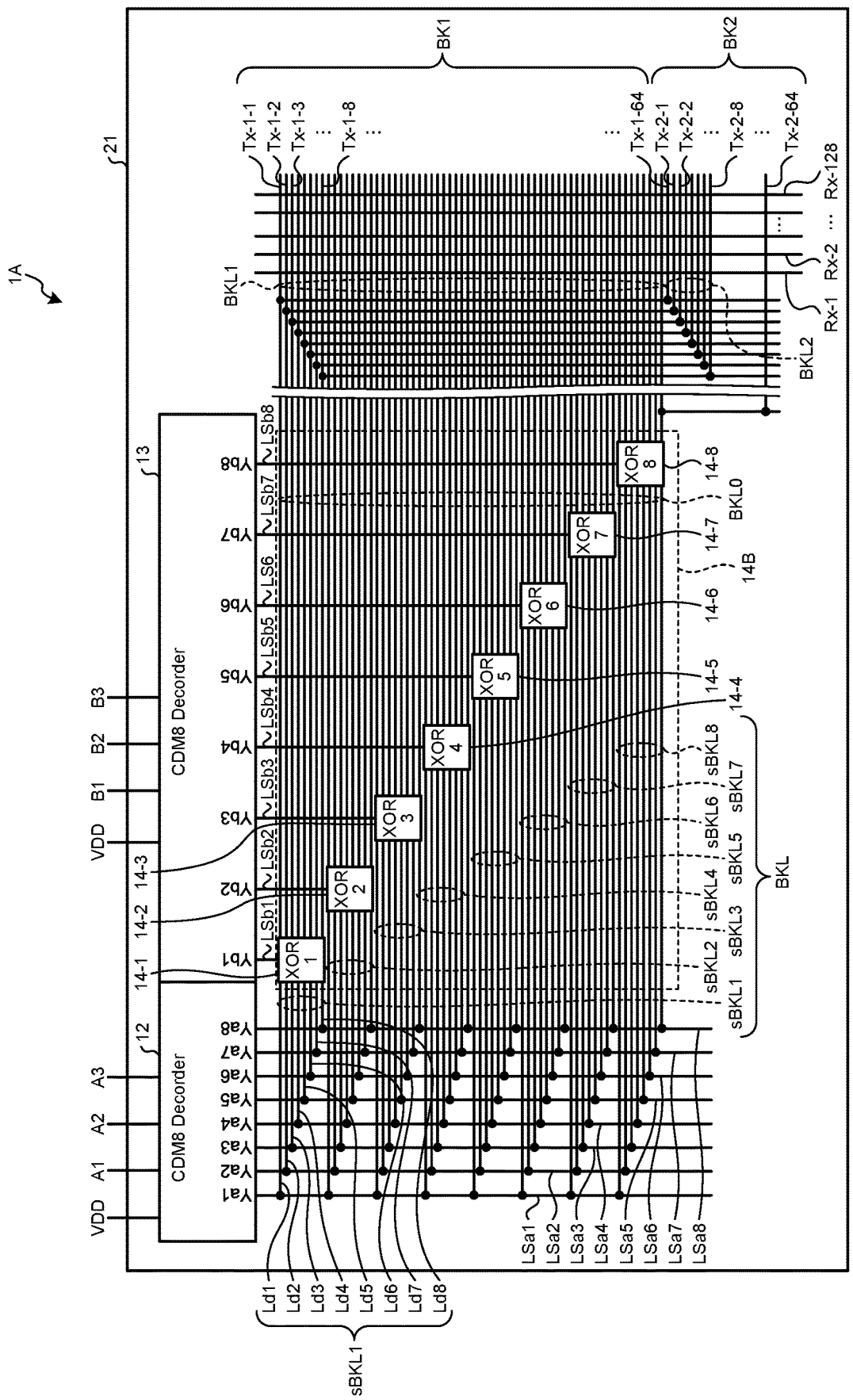
FIG. 25 is a block diagram of the first selection circuit, the second selection circuit, and the third selection circuit according to a first modification of the first embodiment.
Figure 26:
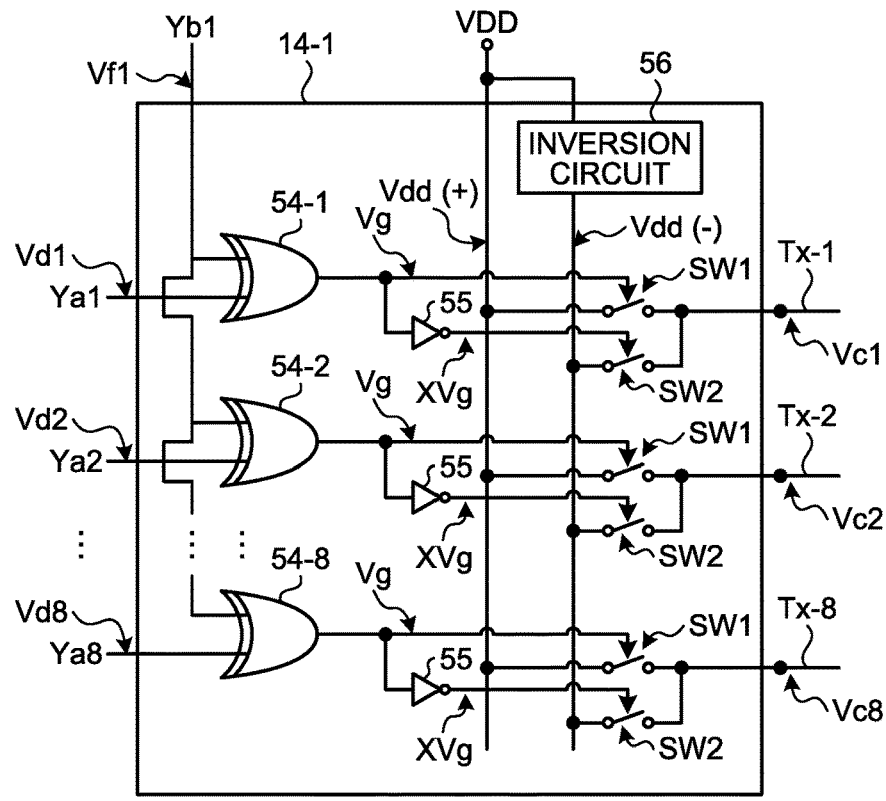
FIG. 26 is a circuit diagram of an example of the third selection circuit according to the first modification of the first embodiment.

FIG. 25 is a block diagram of the first selection circuit, the second selection circuit, and the third selection circuit according to a first modification of the first embodiment. FIG. 26 is a circuit diagram of an example of the third selection circuit according to the first modification of the first embodiment.

In a detection apparatus 1A according to the present modification, the second selection circuit 13 includes the second input terminals B1, B2, and B3, the power source voltage terminal VDD, and the second output terminals Yb1, Yb2, Yb3, Yb4, Yb5, Yb6, Yb7, and Yb8. In other words, the second selection circuit 13 does not include the second input terminal S (refer to FIGS. 10 and 15) that receives the inversion control signal Vs. In the present modification, the second selection signals Vf provided by the second selection circuit 13 have selection patterns similar to those of the first selection signals Vd (refer to FIGS. 13 and 14) generated by the first selection circuit 12.

As illustrated in FIG. 26, the third selection circuit 14-1 includes the XOR circuits 54-1, 54-2, . . . , and 54-8, an inverter 55, an inversion circuit 56, and switches SW1 and SW2. The XOR circuits 54-1, 54-2, . . . , and 54-8 receive the first selection signals Vd1, Vd2, . . . , and Vd8, respectively, from the first output terminals Ya. The XOR circuits 54-1, 54-2, . . . , and 54-8 also receive the second selection signal Vf1 from the second output terminal Yb1. The XOR circuits 54-1, 54-2, . . . , and 54-8 calculate Xor of the first selection signals Vd1, Vd2, . . . , and Vd8, respectively, and the second selection signal Vf1. The third selection circuits 14-2 to 14-8 illustrated in FIG. 25 have the same configuration as described above.

A switch control signal Vg calculated by each of the XOR circuits 54-1, 54-2, . . . , and 54-8 is supplied to the switch SW1. The inverter 55 generates an inverted switch control signal XVg by inverting the switching control signal Vg. The inverted switch control signal XVg is supplied to the switch SW2. The switches SW1 and SW2 are controlled to be turned on and off by the switch control signal Vg and the inverted switch control signal XVg, respectively. One end of the switch SW1 is coupled to the power source voltage terminal VDD. The other end of the switch SW1 is coupled to the first electrode Tx via the drive signal supply line Ld. One end of the switch SW2 is coupled to the inversion circuit 56. The other end of the switch SW2 is coupled to the first electrode Tx via the drive signal supply line Ld. The inversion circuit 56 inverts the polarity of the power source voltage Vdd.

As illustrated in FIG. 26, a first power source voltage signal Vdd(+) having a positive polarity is supplied to the switch SW1, and a second power source voltage signal Vdd(−) having a negative polarity is supplied to the switch SW2. If the switch SW1 is turned on, and the switch SW2 is turned off, the first power source voltage signal Vdd(+) is supplied to the first electrode Tx. If the switch SW1 is turned off, and the switch SW2 is turned on, the second power source voltage signal Vdd(−) is supplied to the first electrode Tx.

The number of combination patterns of the first selection signals Vd and that of the second selection signals Vf are eight each. In the present modification, the pattern code of the drive signals Vc provided by the third selection circuit 14 is obtained by replacing the element "0" with the element "−1" illustrated in FIG. 20. The order of the pattern code is 8×8=64. The drive signals Vc corresponding to the pattern code are substantially simultaneously supplied to the first electrodes Tx-1 to Tx-64.

In the present modification, similarly to the exemplary operation in CDM drive illustrated in FIG. 8, the second electrodes Rx output the third detection signals Vdet3 obtained by integrating the first detection signals Vdet1 and the second detection signals Vdet2. The first detection signals Vdet1 are obtained when the first power source voltage signal Vdd(+) is supplied, and the second detection signals Vdet2 are obtained when the second power source voltage signal Vdd(−) is supplied. The signal processor 44 decodes the third detection signals Vdet3 based on a predetermined code corresponding to the pattern code described above. Based on the decoded signals Vdet4 calculated by the signal processor 44, the detection apparatus 1A can detect contact or proximity of the external proximity object CQ.

As described above, if the second selection circuit 13 does not include the second input terminal S (refer to FIGS. 10 and 15), the detection apparatus 1A can perform CDM drive with the first selection circuit 12, the second selection circuit 13, and the third selection circuit 14. The present modification requires a smaller number of second input terminals of the second selection circuit 13. Consequently, the present modification requires a smaller number of wires used to supply the control signals from the detection controller 11 to the second selection circuit 13.

Second Modification of the First Embodiment

Figure 27:
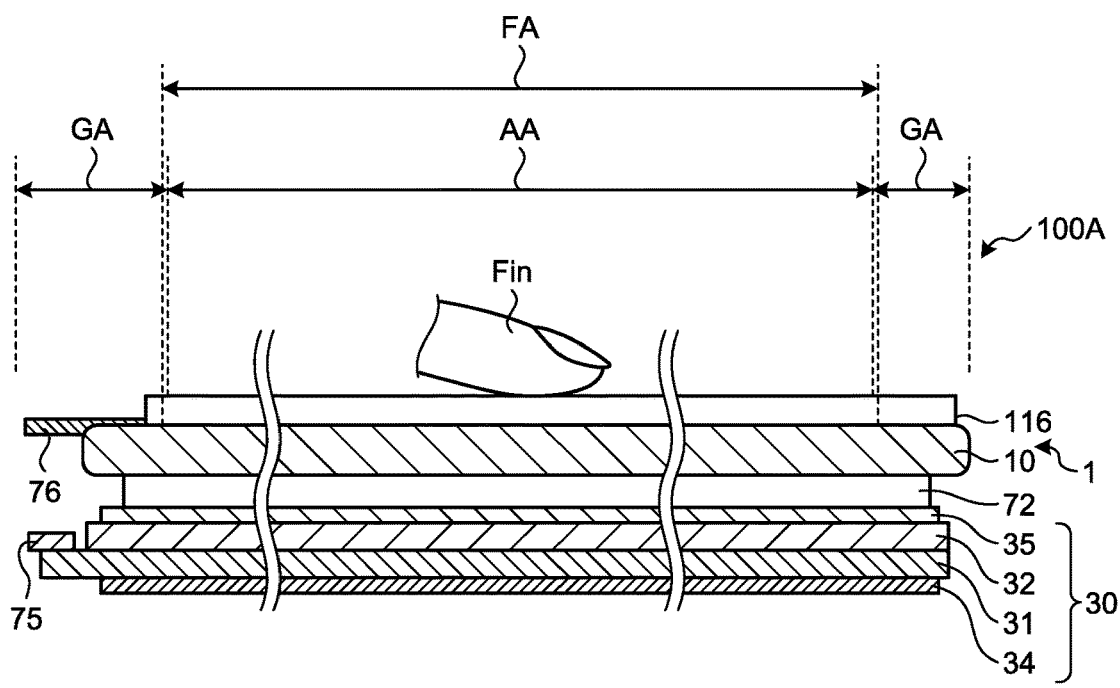
FIG. 27 is a sectional view of a schematic sectional structure of the display apparatus including the detection apparatus according to a second modification of the first embodiment.

FIG. 27 is a sectional view of a schematic sectional structure of the display apparatus including the detection apparatus according to a second modification of the first embodiment. As illustrated in FIG. 27, a display apparatus 100A according to the present modification includes a protective layer 116 on the surface of the sensor 10. The present modification does not include the cover member 101 (refer to FIG. 2). The protective layer 116 is a coating layer made of a UV-curable resin, for example. The protective layer 116 covers the whole surface of the display region AA and the detection region FA. In other words, the protective layer 116 is provided to cover the first electrodes Tx and the second electrodes Rx. The frame region GA of the sensor 10 is provided with part of a housing of an electronic apparatus including the display apparatus 100A.

In the present modification, the surface of the protective layer 116 serves as a detection surface that detects the finger Fin in contact with or in proximity to the display apparatus 100A. This configuration can reduce the distance between the finger Fin in contact with or in proximity to the display apparatus 100A and the first electrodes Tx and the second electrodes Rx. Consequently, the detection apparatus 1 according to the present modification can increase the detection sensitivity.

Second Embodiment

Figure 28:
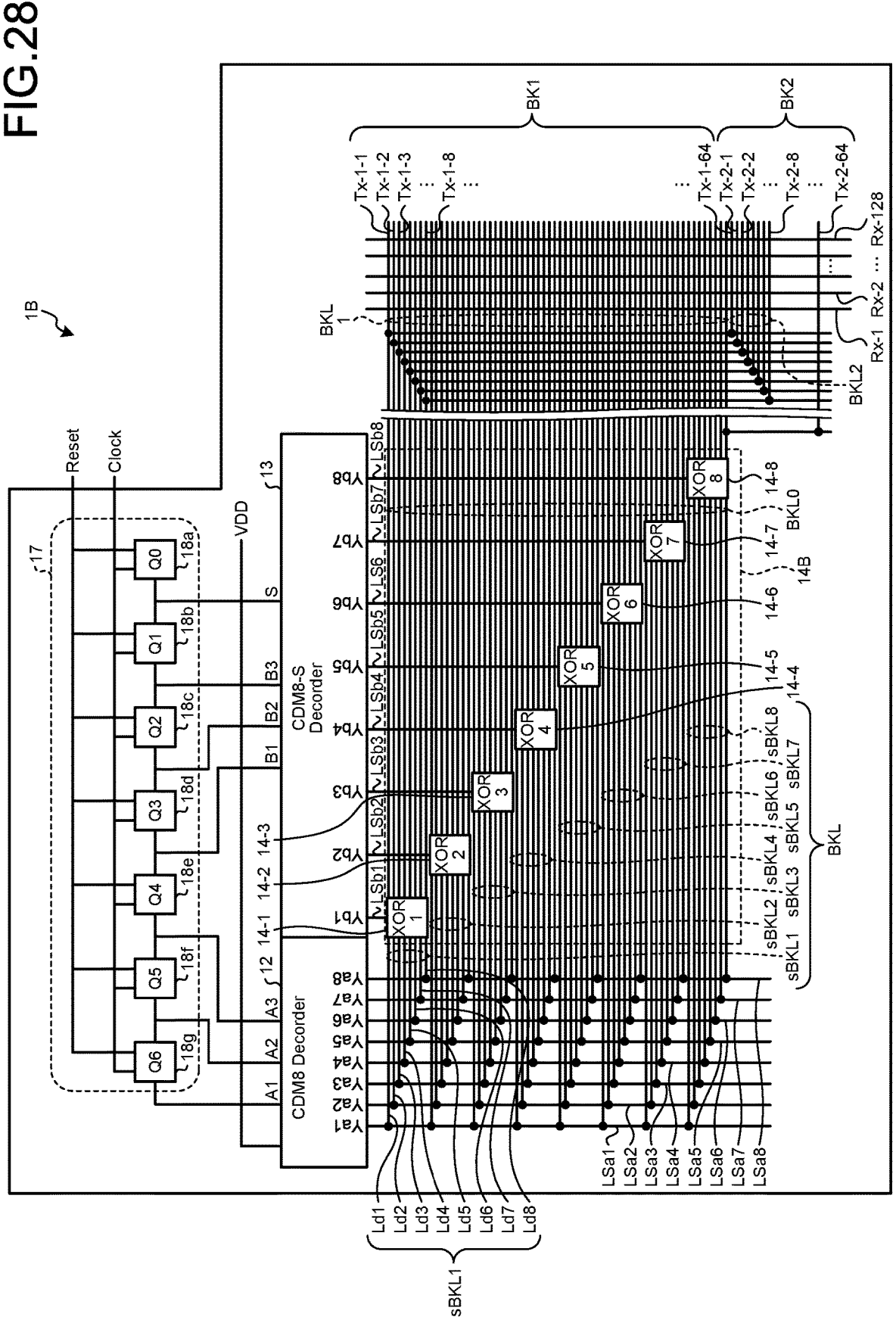
FIG. 28 is a block diagram of the first selection circuit, the second selection circuit, the third selection circuit, and a counter circuit according to a second embodiment of the present disclosure.
Figure 29:
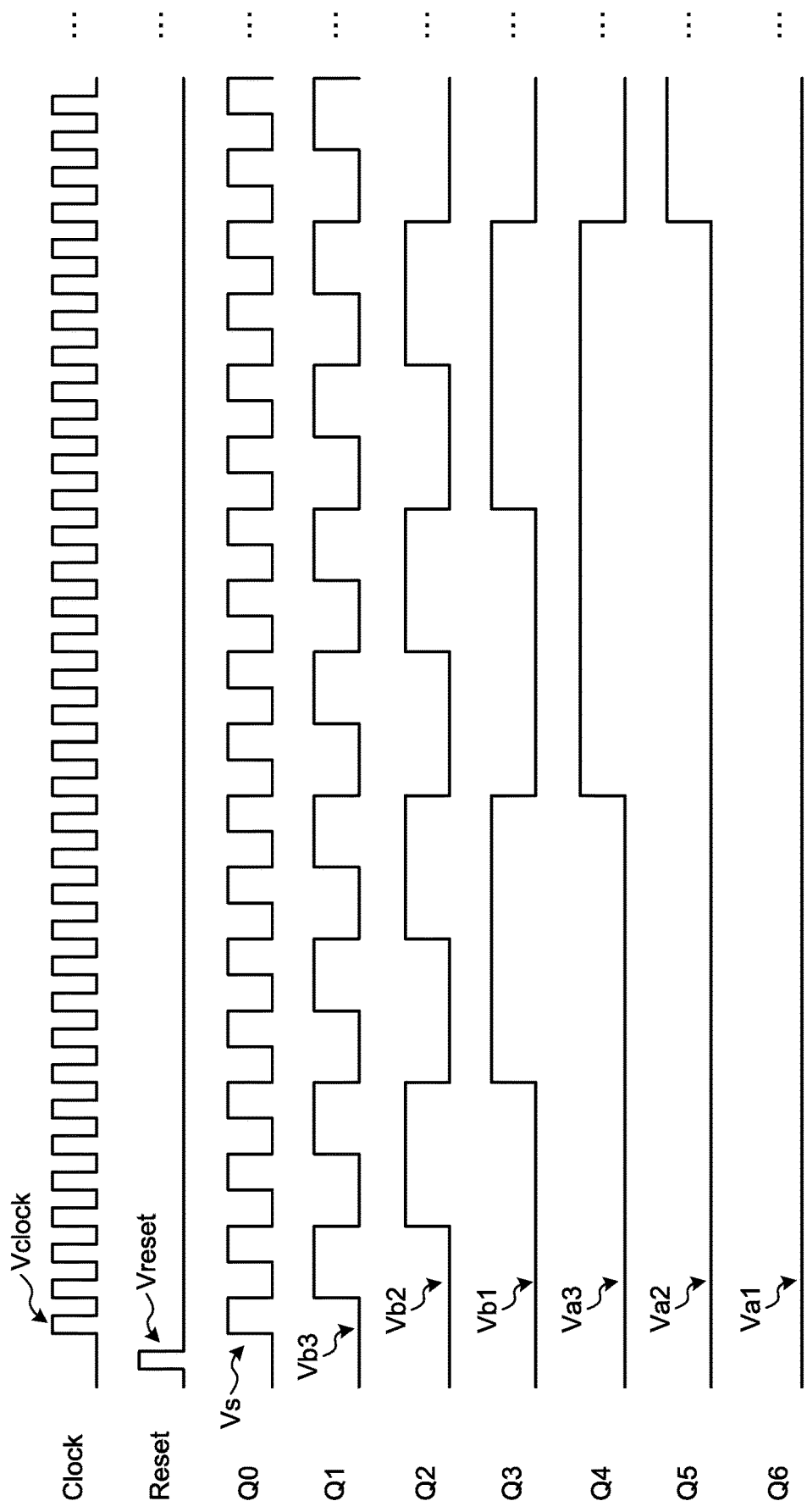
FIG. 29 is a timing waveform chart of an exemplary operation performed by the counter circuit.

FIG. 28 is a block diagram of the first selection circuit, the second selection circuit, the third selection circuit, and a counter circuit according to a second embodiment of the present disclosure. FIG. 29 is a timing waveform chart of an exemplary operation performed by the counter circuit. As illustrated in FIG. 28, a detection apparatus 1B according to the present embodiment includes the first selection circuit 12, the second selection circuit 13, the third selection circuit 14, and a counter circuit 17 on the sensor substrate 21.

The counter circuit 17 generates the first control signals Va1, Va2, and Va3, the second control signals Vb1, Vb2, and Vb3, and the inversion control signal Vs based on a reset signal Vreset and a clock signal Vclock supplied from the detection controller 11 (refer to FIG. 3). The counter circuit 17 is a binary counter circuit, for example, and outputs binary numbers. The counter circuit 17 includes a plurality of flip-flop circuits 18a, 18b, 18c, 18d, 18e, 18f, and 18g. The flip-flop circuits 18a, 18b, 18c, 18d, 18e, 18f, and 18g are registers that can hold one-bit information. In the following description, the flip-flop circuits 18a, 18b, 18c, 18d, 18e, 18f, and 18g are simply referred to as flip-flop circuits 18 when they need not be distinguished from one another.

As illustrated in FIGS. 28 and 29, an output signal from the flip-flop circuit 18a is supplied to the second input terminal S of the second selection circuit 13 as the inversion control signal Vs. The output signal from the flip-flop circuit 18a is also output to the next flip-flop circuit 18b. The frequency of the inversion control signal Vs is one half the frequency of the clock signal Vclock. An output signal from the flip-flop circuit 18b at the second stage is supplied to the second input terminal B3 of the second selection circuit 13 as the second control signal Vb3. The output signal from the flip-flop circuit 18b is also output to the next flip-flop circuit 18c. The frequency of the second control signal Vb3 is one half the frequency of the inversion control signal Vs. Similarly, the flip-flop circuits 18c, 18d, 18e, 18f, and 18g output the second control signals Vb2 and Vb1 and the first control signals Va3, Va2, and Va1, respectively.

If the state of all the flip-flop circuits 18 is "1", the flip-flop circuits 18 are reset to "0" based on the reset signal Vreset.

The configurations of the first selection circuit 12, the second selection circuit 13, the third selection circuit 14 are the same as those according to the first embodiment. Based on the first control signals Va3, Va2, and Va1, the second control signals Vb3, Vb2, and Vb1, and the inversion control signal Vs supplied from the counter circuit 17, the first selection circuit 12, the second selection circuit 13, the third selection circuit 14 supply, to the first electrodes Tx, the drive signals Vc having the phases determined based on a predetermined code. As described above, the detection apparatus 1B performs CDM drive.

In the configuration according to the present embodiment, the counter circuit 17 provided on the sensor substrate 21 includes two external control terminals that receive the reset signal Vreset and the clock signal Vclock. In other words, the configuration requires a smaller number of wires that couple the detection controller 11 and the counter circuit 17 on the sensor substrate 21. The number of output terminals of the counter circuit 17 is equal to the sum of the number of first input terminals A1, A2, and A3 of the first selection circuit 12 and the number of second input terminals B1, B2, B3, and S of the second selection circuit 13. The counter circuit 17 can have a simpler configuration because the detection apparatus 1B includes the first selection circuit 12, the second selection circuit 13, and the third selection circuit 14. Specifically, the pattern codes with 64 order illustrated in FIGS. 20 and 21, for example, are generated based on the output signals from the flip-flop circuits 18 of seven stages in both of the cases where the inversion control signal Vs is turned on and off. With this configuration, the detection apparatus 1B can suppress delay of the signals in the counter circuit 17 and supply the drive signals Vc substantially simultaneously to a large number of first electrodes Tx.

First Modification of the Second Embodiment

Figure 30:
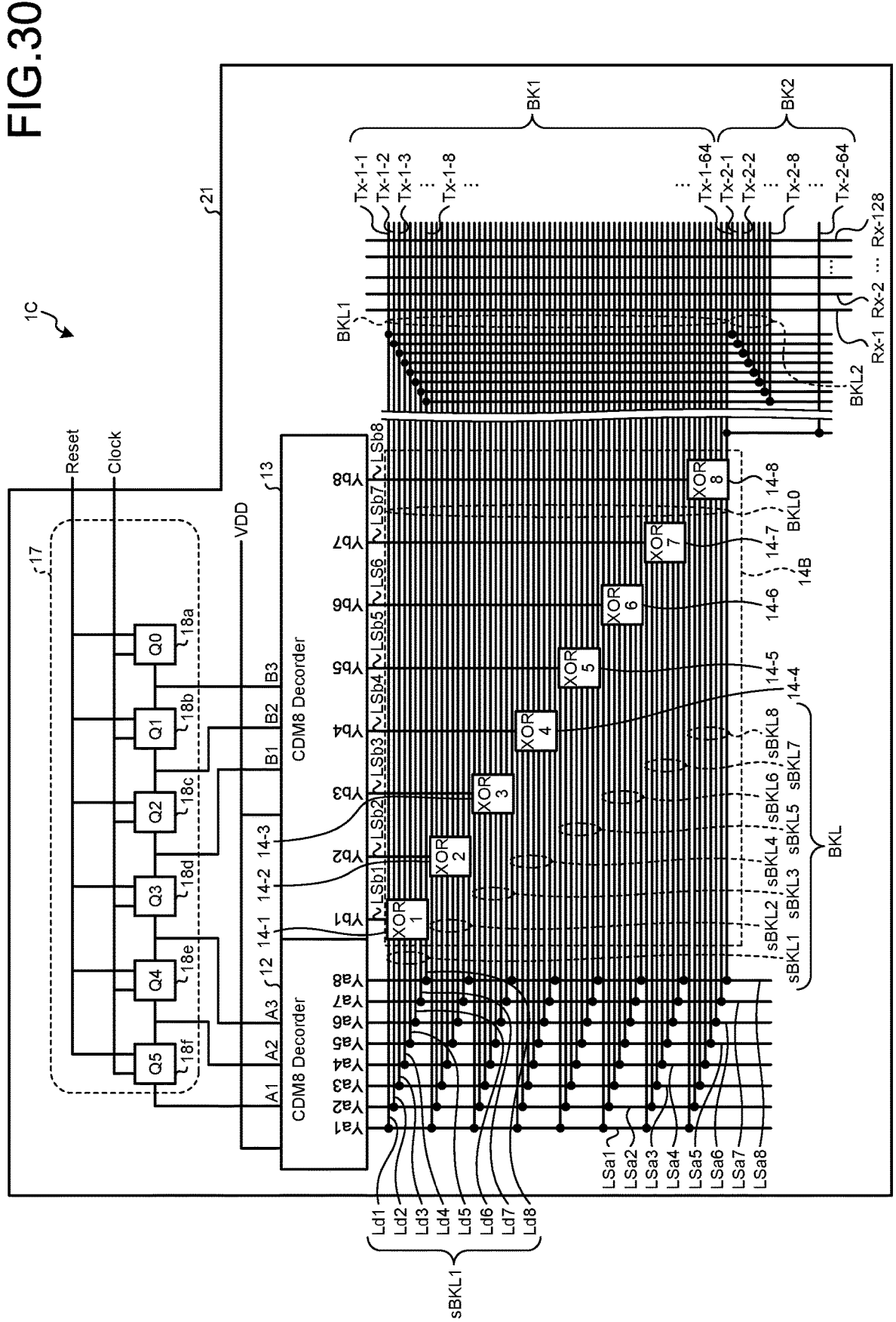
FIG. 30 is a block diagram of the first selection circuit, the second selection circuit, the third selection circuit, and the counter circuit according to a first modification of the second embodiment.

FIG. 30 is a block diagram of the first selection circuit, the second selection circuit, the third selection circuit, and the counter circuit according to a first modification of the second embodiment. In a detection apparatus 1C according to the present modification, the counter circuit 17 includes the flip-flop circuits 18a, 18b, 18c, 18d, 18e, and 18f of six stages.

In the present modification, the second selection circuit 13 does not include the second input terminal S. In other words, the output signal from the flip-flop circuit 18a is supplied to the second input terminal B3 of the second selection circuit 13 as the second control signal Vb3. The output signal from the flip-flop circuit 18b is supplied to the second input terminal B2 of the second selection circuit 13 as the second control signal Vb2. Similarly, the flip-flop circuits 18c, 18d, 18e, and 18f output the second control signal Vb1 and the first control signals Va3, Va2, and Va1, respectively.

The counter circuit 17 according to the present modification can have a simpler configuration than the configuration illustrated in FIG. 28. Specifically, the present modification requires a smaller number of terminals and wires that couple the counter circuit 17 and the second selection circuit 13. Also in the present modification, the first selection circuit 12, the second selection circuit 13, and the third selection circuit 14 similar to that illustrated in FIG. 26 can generate a pattern code obtained by replacing the element "0" with the element "−1" in the pattern code with 64 order illustrated in FIG. 20, for example, based on the output signals from the flip-flop circuits 18 of six stages.

Second Modification of the Second Embodiment

Figure 31:
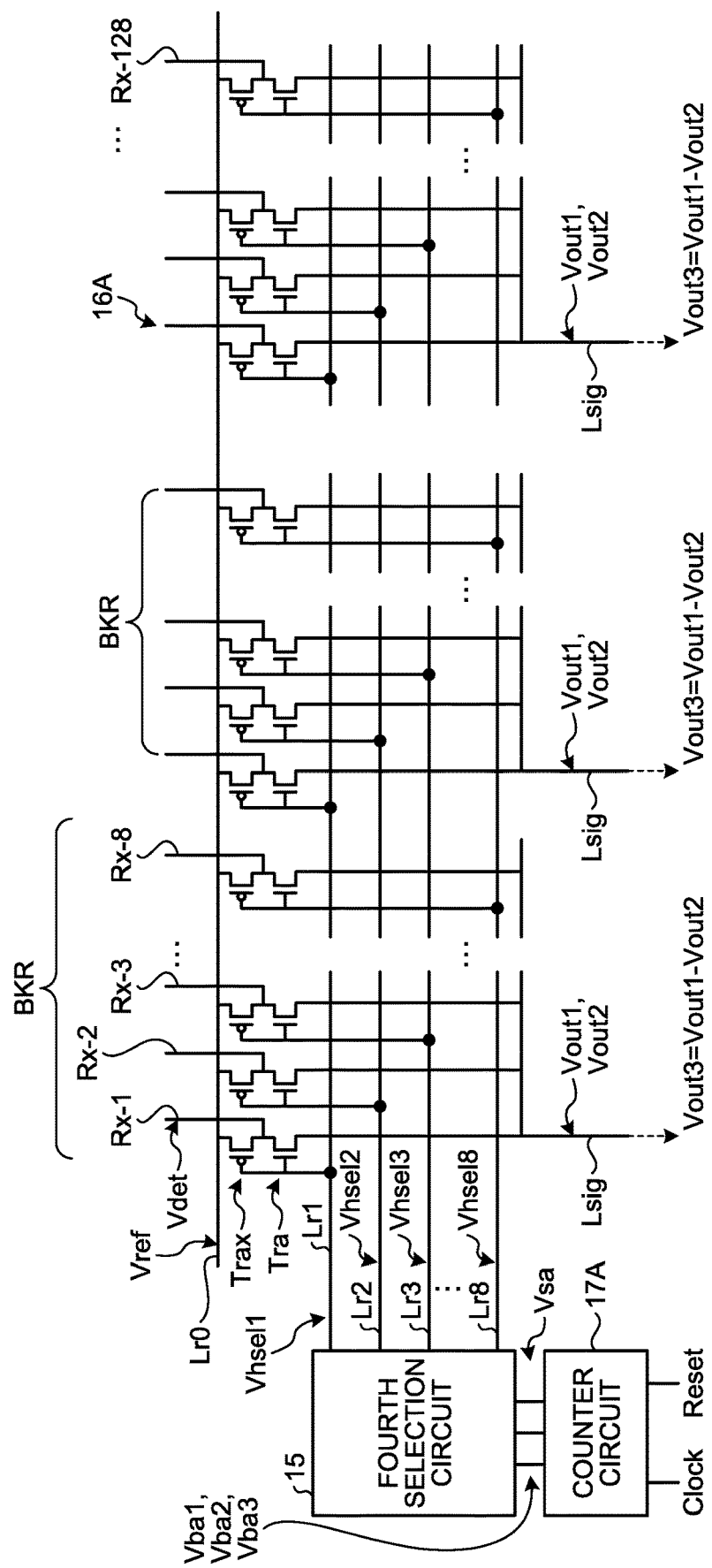
FIG. 31 is a circuit diagram of another example of the detection electrode selection circuit according to a second modification of the second embodiment.

FIG. 31 is a circuit diagram of another example of the detection electrode selection circuit according to a second modification of the second embodiment. A detection electrode selection circuit 16A according to the present modification includes a counter circuit 17A and a fourth selection circuit 15. The counter circuit 17A according to the present modification operates based on the clock signal Vclock and the reset signal Vreset (refer to FIG. 29) supplied from the detection controller 11. The counter circuit 17A includes the flip-flop circuits 18a, 18b, 18c, and 18d of four stages, for example. The counter circuit 17A outputs an inversion control signal Vsa and three control signals Vba1, Vba2, and Vba3 to the fourth selection circuit 15.

The fourth selection circuit 15 has the same circuit configuration as that of the second selection circuit 13 illustrated in FIG. 15, for example. The fourth selection circuit 15 generates the second electrode selection signals Vhsel1, Vhsel2, Vhsel3, . . . , and Vhsel8 based on the inversion control signal Vsa and the three control signals Vba1, Vba2, and Vba3. The second electrode selection signals Vhsel1, Vhsel2, Vhsel3, . . . , and Vhsel8 are supplied to the first switching elements Tra and the second switching elements Trax via the second electrode selection signal lines Lr1, Lr2, Lr3, . . . , and Lr8, respectively. The detection electrode selection circuit 16A thus can perform CDM drive on the second electrodes Rx. In the present modification, the number of external input terminals of the detection electrode selection circuit 16A is two, which is the number of input terminals of the counter circuit 17A. This configuration can simplify the coupling between the detection electrode selection circuit 16A and the detection controller 11 and reduce the circuit size.

Third Embodiment

Figure 32:
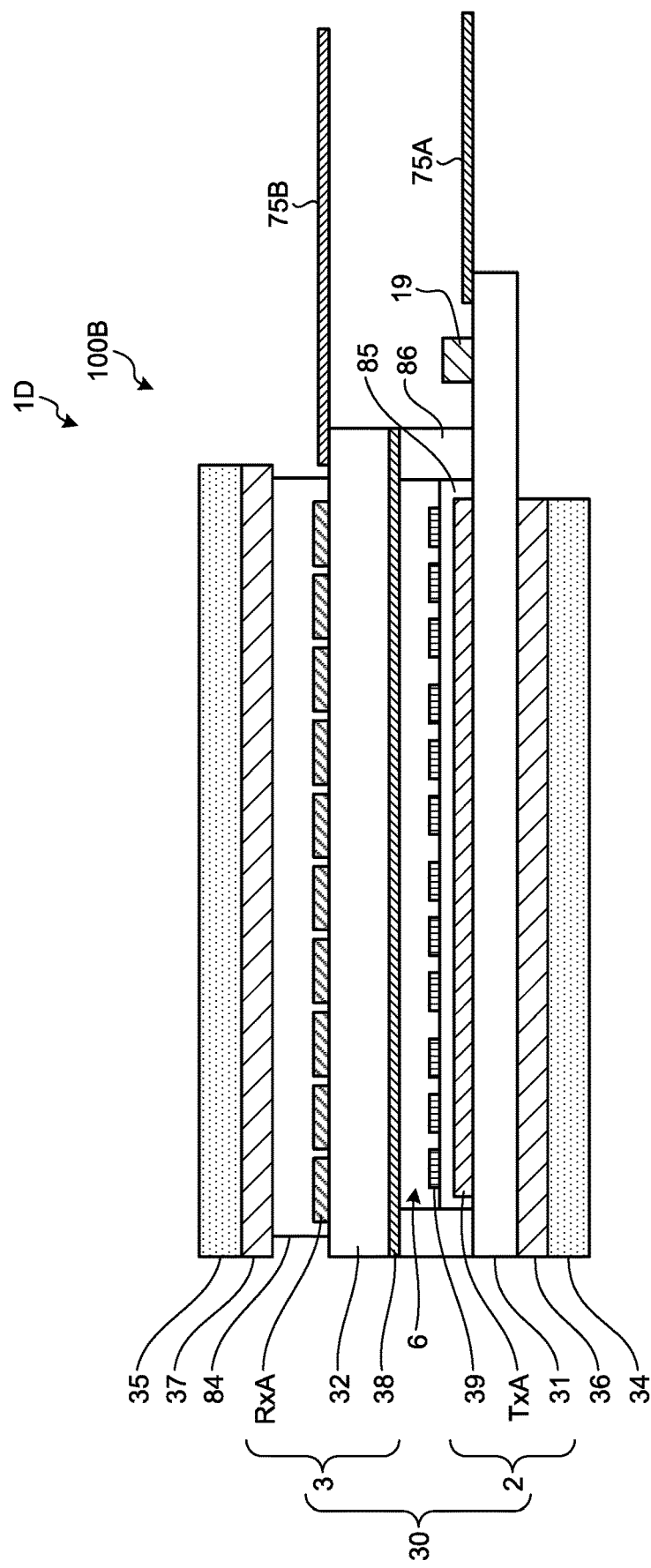
FIG. 32 is a sectional view of a schematic sectional structure of the display apparatus including the detection apparatus according to a third embodiment of the present disclosure.
Figure 33:
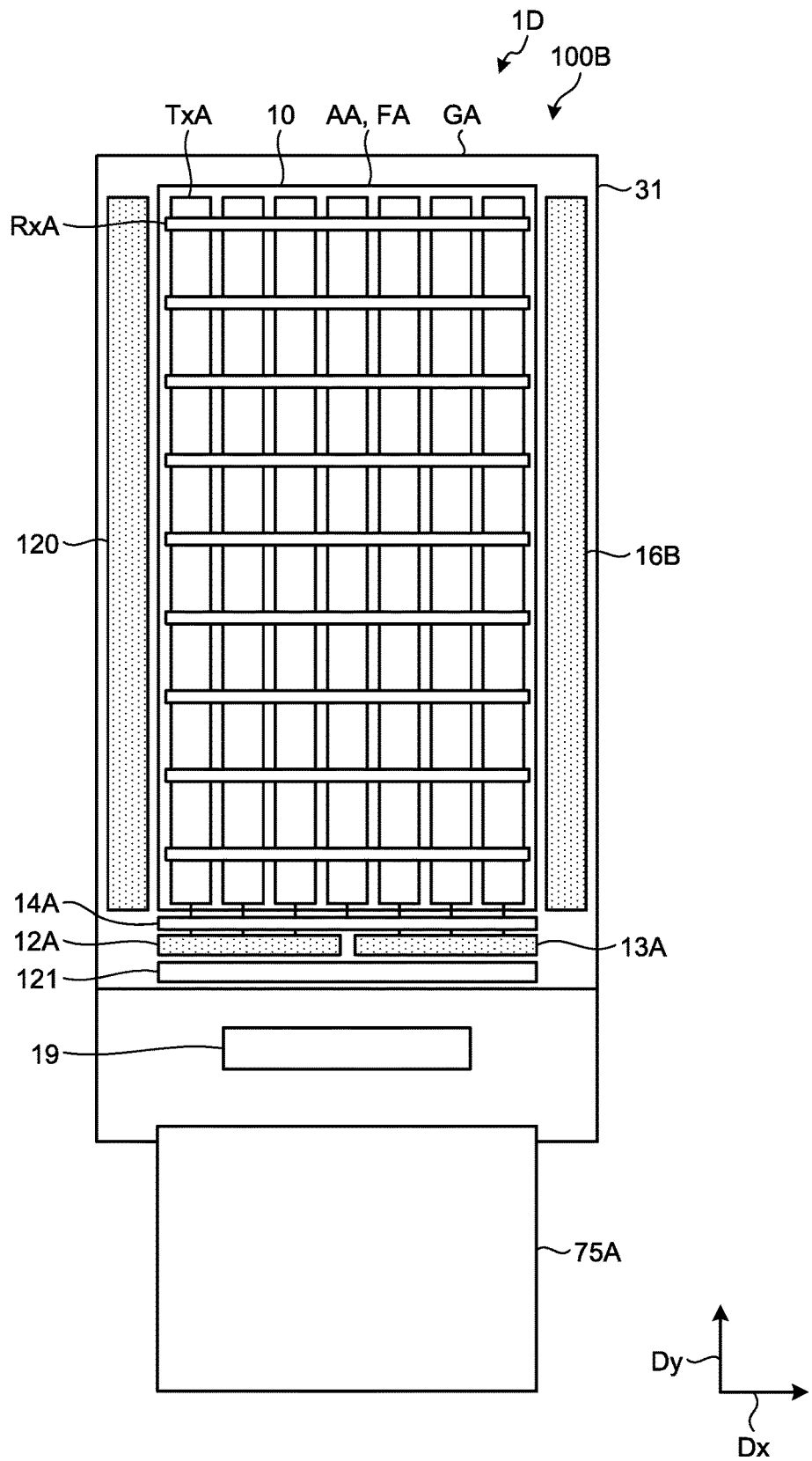
FIG. 33 is a plan view of the detection apparatus according to the third embodiment.

FIG. 32 is a sectional view of a schematic sectional structure of the display apparatus including the detection apparatus according to a third embodiment of the present disclosure. FIG. 33 is a plan view of the detection apparatus according to the third embodiment. A display apparatus 100B according to the present embodiment is an apparatus in which the display panel 30 and a detection apparatus 1D are integrated. An apparatus in which the display panel 30 and the detection apparatus 1D are integrated means an apparatus in which part of substrates and electrodes are shared by the display panel 30 and the detection apparatus 1D, for example.

Specifically, as illustrated in FIG. 32, the display apparatus 100B includes a pixel substrate 2, a counter substrate 3, and a liquid crystal layer 6. The counter substrate 3 is disposed facing the pixel substrate 2. The liquid crystal layer 6 is provided between the pixel substrate 2 and the counter substrate 3.

The pixel substrate 2 includes the first substrate 31, a plurality of pixel electrodes 39, a plurality of first electrodes TxA, and an insulating layer 85. The first substrate 31 is a circuit board provided with thin-film transistors (TFT) and various kinds of wiring. The pixel electrodes 39 are arrayed in a matrix (row-column configuration) on the first substrate 31. The first electrodes TxA are provided between the first substrate 31 and the pixel electrodes 39. The insulating layer 85 insulates the pixel electrodes 39 from the first electrodes TxA. The polarizing plate 34 is provided under the first substrate 31 with an adhesive layer 36 interposed therebetween.

The counter substrate 3 includes the second substrate 32, a color filter 38, and second electrodes RxA. The color filter 38 is provided on one surface of the second substrate 32. The second electrodes RxA are provided on the other surface of the second substrate 32. An insulating layer 84 is provided on the second substrate 32 to cover the second electrodes RxA. The polarizing plate 35 is provided on the insulating layer 84 with an adhesive layer 37 interposed therebetween. The first substrate 31 and the second substrate 32 according to the present embodiment are glass substrates or resin substrates, for example.

The first substrate 31 is coupled to a driver IC 19 and a flexible printed circuit board 75A. The second substrate 32 is coupled to a flexible printed circuit board 75B. The driver IC 19 is a control circuit that controls display and detection in the display apparatus 100B. Part or all of the functions of the detection controller 11 and the detector 40 may be included in the driver IC 19 or in another touch IC or a control substrate.

The first substrate 31 and the second substrate 32 are disposed facing each other with a predetermined gap formed by a sealing portion 86 interposed therebetween. The liquid crystal layer 6 is provided in the space surrounded by the first substrate 31, the second substrate 32, and the sealing portion 86. The liquid crystal layer 6 modulates light passing therethrough depending on the state of an electric field. The liquid crystal layer 6, for example, includes liquid crystals in a lateral electric-field mode, such as the in-plane switching (IPS) mode including the fringe field switching (FFS) mode. Orientation films may be provided between the liquid crystal layer 6 and the pixel substrate 2 and between the liquid crystal layer 6 and the counter substrate 3 illustrated in FIG. 32.

An illuminator is provided under the first substrate 31. The illuminator includes a light source, such as a light emitting diode (LED), and outputs light from the light source toward the first substrate 31. The light output from the illuminator passes through the pixel substrate 2. The display apparatus 100B switches the portions that block and prevent the light from being output and the portions that allow the light to be output depending on the state of liquid crystals at the corresponding positions, thereby displaying an image on the display surface. If the display apparatus 100B is a reflective liquid crystal display apparatus including reflective electrodes that reflect light entering from the second substrate 32 side as the pixel electrodes 39 and including translucent second electrodes RxA in the counter substrate 3 side, the illuminator is not necessarily provided under the first substrate 31. The reflective liquid crystal display apparatus may include a front light on the second substrate 32. In this case, light entering from the second substrate 32 side is reflected by the reflective electrodes (pixel electrodes 39), passes through the second substrate 32, and reaches the eyes of an observer. If the display panel 30 (refer to FIG. 32) is an OLED, the display panel 30 includes self-luminous bodies for respective pixels. In this case, the display panel 30 displays an image by controlling the lighting quantities of the respective self-luminous bodies. Consequently, the display apparatus 100B requires no illuminator. If the display panel 30 is an OLED, the display layer may be included in the pixel substrate 2. A luminous layer serving as the display layer, for example, may be disposed between the first electrodes TxA and the pixel electrodes 39.

As illustrated in FIG. 33, the display apparatus 100B includes the first electrodes TxA and the second electrodes RxA in the region overlapping the display region AA. The first electrodes TxA extend in a direction (second direction Dy) along one side of the display region AA and are arrayed in a direction (first direction Dx) along the other side of the display region AA with a space interposed therebetween. The first electrodes TxA are coupled to a first selection circuit 12A, a second selection circuit 13A, and a third selection circuit 14A. The first electrodes TxA are made of a translucent conductive material, such as ITO.

The second electrodes RxA extend in the first direction Dx and are arrayed in the second direction Dy with a space interposed therebetween. In other words, the first electrodes TxA and the second electrodes RxA intersect in planar view, and capacitance is formed at the overlapping portions. The second electrodes RxA are coupled to a detection electrode selection circuit 16B. The second electrodes RxA are made of a metal material, for example. The second electrodes RxA may be made of a translucent conductive material, such as ITO.

The first substrate 31 is further provided with a gate driver 120 and a source driver 121. The gate driver 120 has a function of sequentially selecting one horizontal line to be a target of display drive in the display panel 30. The source driver 121 is a circuit that supplies pixel signals to the respective pixels in the display panel 30.

In a display operation, the gate driver 120 sequentially selects one horizontal line out of the pixels as a target of display drive. The display apparatus 100B causes the source driver 121 to supply the pixel signals to the pixels belonging to one horizontal line, thereby performing display in units of one horizontal line. The driver IC 19 applies display drive signals to all the first electrodes TxA. In other words, the first electrodes TxA serve as common electrodes that supply a common potential to a plurality of pixels.

In a detection operation, the first selection circuit 12A, the second selection circuit 13A, and the third selection circuit 14A supply the drive signals Vc having the phases determined based on a predetermined code to the first electrodes TxA. The detection apparatus 1D thus performs CDM drive. The first selection circuit 12A, the second selection circuit 13A, and the third selection circuit 14A have the same configurations as those according to the first embodiment. The detection apparatus 1D may further include a counter circuit similarly to the second embodiment.

The second electrodes RxA output the signals corresponding to changes in capacitance between the first electrodes TxA and the second electrodes RxA. The detection electrode selection circuit 16B selects the second electrodes RxA based on a predetermined code. The detection apparatus 1D thus performs touch detection or fingerprint detection.

The display apparatus 100B may perform the display operation and the detection operation in a time-division manner. The display apparatus 100B may perform the display operation and the detection operation in any division manner. The display apparatus 100B, for example, performs the touch detection operation and the display operation by dividing them into a plurality of sections in one frame period of the display panel 30, that is, in a time required to display video information of one screen.

Fourth Embodiment

Figure 34:
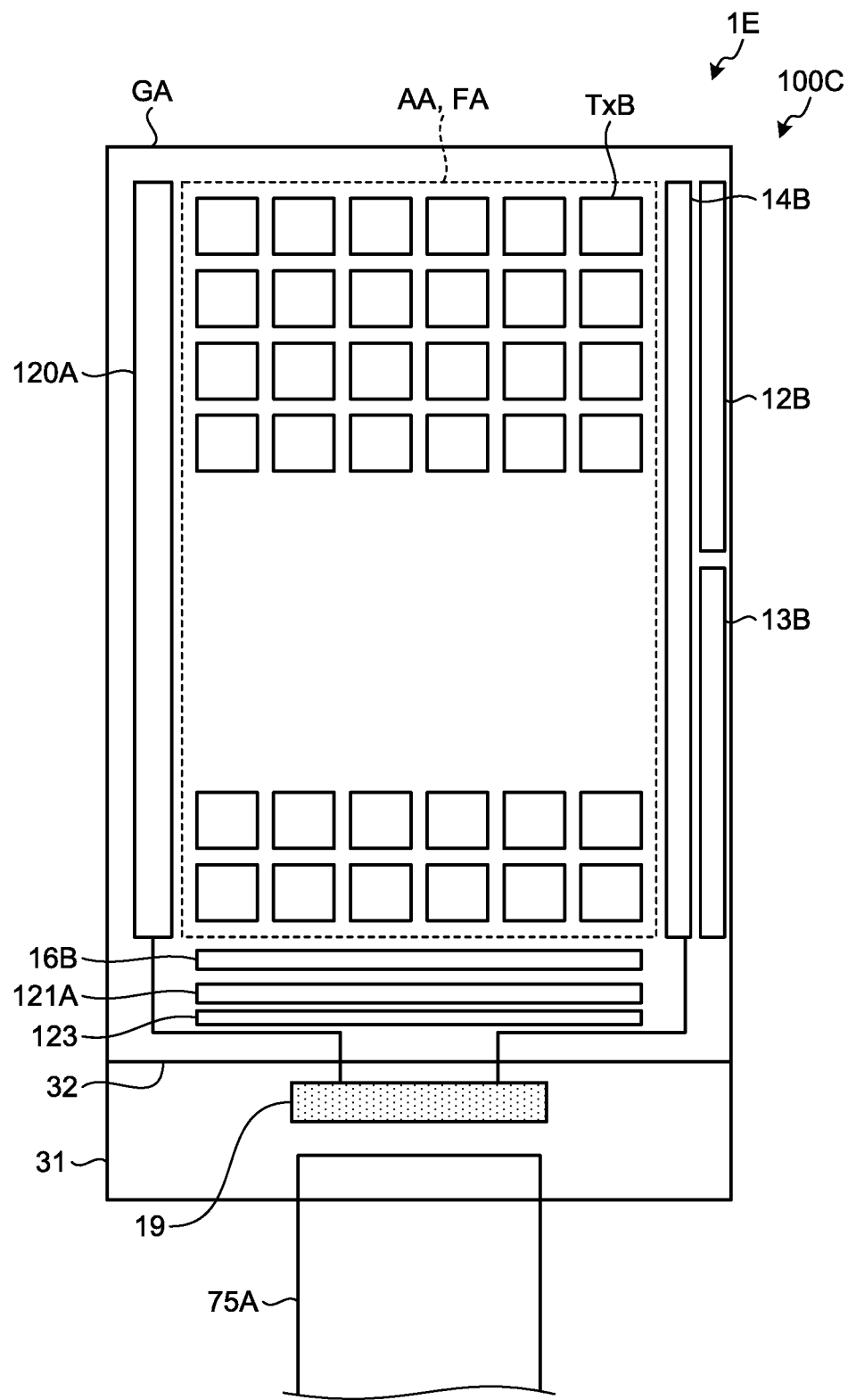
FIG. 34 is a plan view of the detection apparatus according to a fourth embodiment of the present disclosure.
Figure 35:
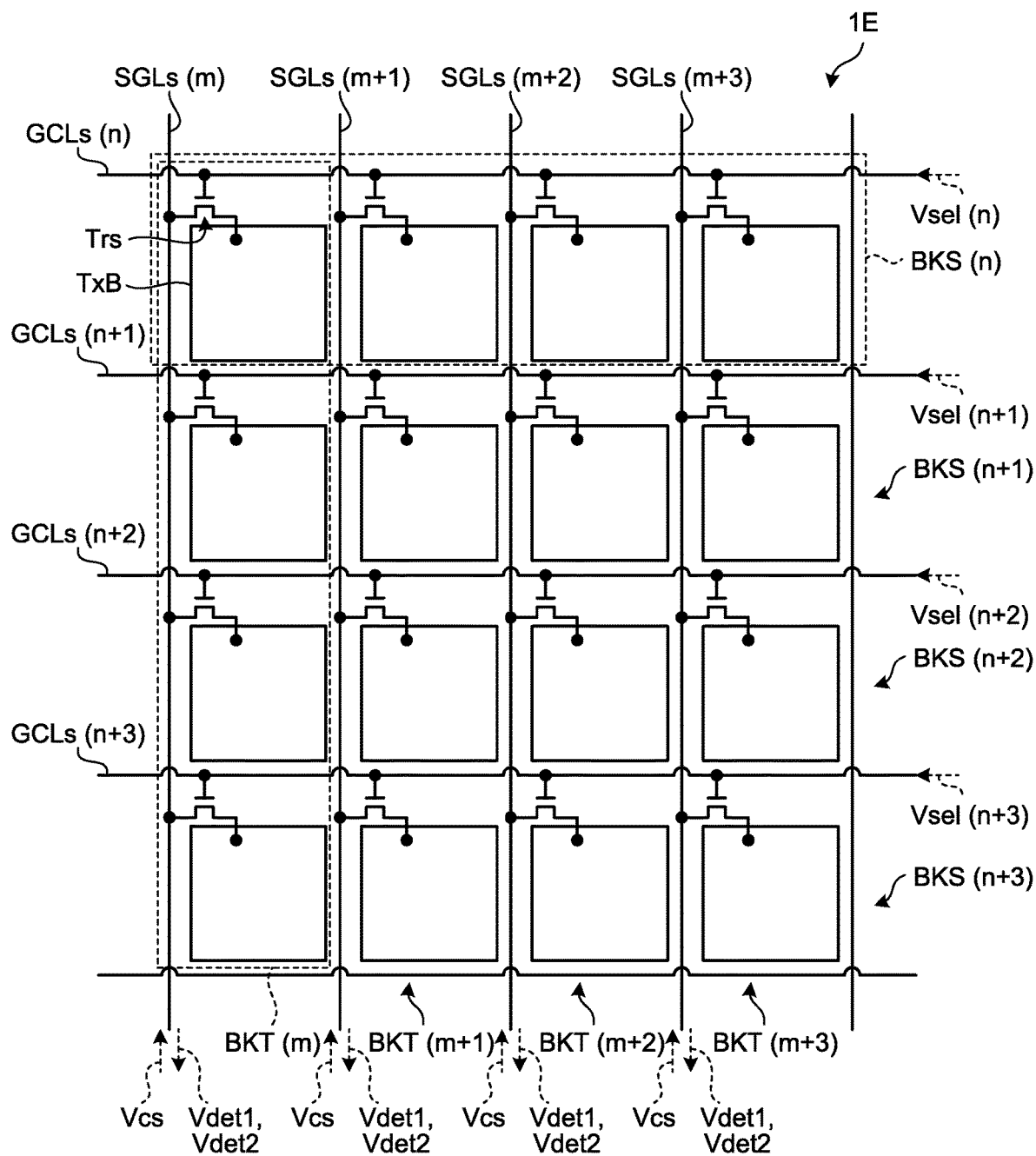
FIG. 35 is a circuit diagram of an array of the first electrodes in the detection apparatus according to the fourth embodiment.

FIG. 34 is a plan view of the detection apparatus according to a fourth embodiment of the present disclosure. FIG. 35 is a circuit diagram of an array of the first electrodes in the detection apparatus according to the fourth embodiment. As illustrated in FIG. 34, a plurality of first electrodes TxB are provided in a matrix (row-column configuration) in the display region AA of the first substrate 31. The first electrodes TxB have a rectangular shape and are arrayed in directions along the long side and the short side of the display region AA. One first electrode TxB may be provided corresponding to one pixel described above or a plurality of pixels.

As illustrated in FIG. 35, the first electrodes TxB each include a detection switching element Trs. The detection switching element Trs is a thin-film transistor and is an n-channel metal oxide semiconductor (MOS) TFT in this example. A plurality of detection gate lines GCLs extend in the row direction and are arrayed in the column direction. A plurality of detection data lines SGLs extend in the column direction and are arrayed in the row direction. The first electrodes TxB are provided in the respective areas surrounded by the detection gate lines GCLs and the detection data lines SGLs. The detection switching elements Trs are provided near the respective intersections of the detection gate lines GCLs and the detection data lines SGLs.

The source of the detection switching element Trs is coupled to the detection data line SGLs, the gate thereof is coupled to the detection gate line GCLs, and the drain thereof is coupled to the first electrode TxB. A selection electrode block BKS is an electrode block including a plurality of first electrodes TxB coupled to a common detection gate line GCLs. A detection electrode block BKT is an electrode block including a plurality of first electrodes TxB coupled to a common detection data line SGLs. As illustrated in FIG. 35, the detection data line SGLs and the detection electrode block BKT in the m-th column are referred to as a detection data line SGLs(m) and a detection electrode block BKT(m), respectively. Similarly, the detection gate line GCLs and the selection electrode block BKS in the n-th row are referred to as a detection gate line GCLs(n) and a selection electrode block BKS(n), respectively. While FIG. 35 illustrates the first electrodes TxB in four rows and four columns to simplify the explanation, the first electrodes TxB may be provided in 64 rows and 64 columns or more, for example.

A first selection circuit 12B, a second selection circuit 13B, and a third selection circuit 14B illustrated in FIG. 34 supply selection signals Vsel(n), Vsel(n+1), Vsel(n+2), and Vsel(n+3) having the phases determined based on a predetermined code to the detection gate lines GCLs(n), GCLs (n+1), GCLs(n+2), and GCLs(n+3), respectively. The selection signals Vsel(n), Vsel(n+1), Vsel(n+2), and Vsel(n+3) are supplied to the gates of the detection switching elements Trs. As a result, one or two or more selection electrode blocks BKS are selected as a target of detection.

A first electrode driver 123 illustrated in FIG. 34 supplies drive signals Vcs to the first electrodes TxB selected from the first electrodes TxB belonging to the detection electrode block BKT via the detection data line SGLs. The selected first electrodes TxB output, to the detector 40 (refer to FIG. 3), the first detection signals Vdet1 and the second detection signals Vdet2 corresponding to changes in capacitance in the respective first electrodes TxB via the detection data line SGLs. The first detection signal Vdet1 is a detection signal corresponding to the code used when the inversion control signal Vs is 1 (refer to FIG. 20). The second detection signal Vdet2 is a detection signal corresponding to the code used when the inversion control signal Vs is 0 (refer to FIG. 21). In other words, the first detection signal Vdet1 is a detection signal from the first electrode TxB corresponding to the element "1" in the code illustrated in FIG. 20. The second detection signal Vdet2 is a detection signal from the first electrode TxB corresponding to the element "0" in the code illustrated in FIG. 20.

As described above, the signal processor 44 calculates the difference between the first detection signal Vdet1 and the second detection signal Vdet2 as the third detection signal Vdet3. The signal processor 44 decodes the third detection signals Vdet3, thereby detecting the finger Fin in contact with or in proximity to a detection apparatus 1E. The detection apparatus 1E according to the present embodiment can detect the finger Fin in contact with or in proximity to the detection apparatus 1E by what is called a self-capacitance method.

The detection electrode selection circuit 16B illustrated in FIG. 34 selects one or two or more detection data lines SGLs out of the detection data lines SGLs(m), SGLs(m+1), SGLs(m+2), and SGLs(m+3) based on a predetermined code. As a result, the detection electrode blocks BKT are selected. The selected one or two or more detection electrode blocks BKT output, to the detector 40 (refer to FIG. 3), the first output signal Vout1 (refer to FIG. 24) obtained by integrating the first detection signals Vdet1. Similarly, the selected one or two or more detection electrode blocks BKT output, to the detector 40 (refer to FIG. 3), the second output signal Vout2 (refer to FIG. 24) obtained by integrating the second detection signals Vdet2. The signal processor 44 calculates the third output signal Vout3, which is the value of difference between the first output signal Vout1 and the second output signal Vout2.

The detection apparatus 1E obtains the combination patterns of detection electrode blocks BKT corresponding to the order of the square matrix used as the predetermined code. In other words, the detection apparatus 1E obtains a plurality of third output signals Vout3 based on the combination patterns of different detection electrode blocks BKT. The signal processor 44 decodes the third output signals Vout3.

As described above, the first selection circuit 12B, the second selection circuit 13B, the third selection circuit 14B, and the detection electrode selection circuit 16B can perform CDM drive on the first electrodes TxB disposed in a matrix (row-column configuration) in the row direction and the column direction. Consequently, a display apparatus 100C including the detection apparatus 1E according to the present embodiment can increase the detection sensitivity if the area of the first electrodes TxB is small.

In the display operation, a gate driver 120A sequentially selects one horizontal line out of the pixels as a target of display drive. The display apparatus 100C causes a source driver 121A to supply the pixel signals to the pixels belonging to one horizontal line, thereby performing display in units of one horizontal line. The first selection circuit 12B, the second selection circuit 13B, the third selection circuit 14B, and the detection electrode selection circuit 16B select all the first electrodes TxB. The first electrode driver 123 supplies display drive signals to the selected first electrodes TxB. In other words, the first electrodes TxB serve not only as detection electrodes in the detection operation but also as common electrodes in the display operation.

While exemplary embodiments according to the present disclosure have been described, the embodiments are not intended to limit the disclosure. The contents disclosed in the embodiments are given by way of example only, and various changes may be made without departing from the spirit of the disclosure. Appropriate modifications made without departing from the spirit of the present disclosure naturally fall within the technical scope of the disclosure.

What is claimed is:

1. A detection apparatus comprising:
a substrate;
a plurality of first electrodes provided on the substrate;
a first selection circuit provided on the substrate, the first selection circuit including a plurality of first input terminals that receive a first control signal supplied from an outside and a plurality of first output terminals that output a first selection signal based on the first control signal; and
a second selection circuit provided on the substrate, the second selection circuit including a plurality of second input terminals that receive a second control signal supplied from the outside and a plurality of second output terminals that output a second selection signal based on the second control signal, wherein
the first electrodes are supplied with a drive signal having a phase determined based on the first selection signal and the second selection signal,
$N \leq P \times Q$ is satisfied where N is the number of the first electrodes, P is the number of the first output terminals, and Q is the number of the second output terminals, and
the sum of the number of the first input terminals and the number of the second input terminals is equal to or smaller than $(1+N')$ based on Expression (1):

$$N' = \text{Ceil}(\log_2 N) \qquad (1)$$

where Ceil is a ceiling function and is the smallest integer of integers equal to or larger than $\log_2 N$ with respect to $\log_2 N$.

2. The detection apparatus according to claim 1, further comprising:
a third selection circuit configured to provide a third selection signal based on the first selection signal and the second selection signal, wherein
the third selection signal includes selection patterns corresponding to combination patterns of the first electrodes to be selected, and
the number of the selection patterns is $2^{N'}$.

3. The detection apparatus according to claim 2, wherein the third selection circuit includes an exclusive OR circuit or an exclusive NOR circuit, and
the third selection signal is a signal based on exclusive or of the first selection signal and the second selection signal or negation of the exclusive or of the first selection signal and the second selection signal.

4. The detection apparatus according to claim 1, further comprising a plurality of drive signal supply line blocks each including a plurality of drive signal supply lines configured to supply the drive signal, the drive signal supply lines being coupled to the first electrodes respectively, wherein one first output terminal is coupled to one drive signal supply line in each of the drive signal supply line blocks, and one second output terminal is coupled to a plurality of the drive signal supply lines included in one drive signal supply line block.

5. The detection apparatus according to claim 1, further comprising:

a plurality of second electrodes configured to form capacitance between the second electrodes and the first electrodes, wherein the drive signal is simultaneously supplied to at least one of the first electrodes selected based on the first selection signal and the second selection signal, and the second electrodes output a detection signal corresponding to a change in capacitance.

6. The detection apparatus according to claim 5, further comprising:

a detection electrode selection circuit configured to select at least one of the second electrodes, wherein the detection electrode selection circuit couples the at least one of the second electrodes based on a predetermined code to one output signal line.

7. The detection apparatus according to claim 1, wherein the first electrodes are disposed in a matrix (row-column configuration), and at least one of the first electrodes selected based on the first selection signal and the second selection signal output a detection signal corresponding to a change in capacitance in the respective first electrodes.

8. The detection apparatus according to claim 1, wherein an arrangement interval of the first electrodes is equal to or smaller than 100 μm.

9. A display apparatus comprising:
the detection apparatus according to claim 1; and
a display panel configured to display an image, wherein the detection apparatus is provided on the display panel.

10. A display apparatus comprising:
the detection apparatus according to claim 1; and
a display panel configured to display an image, wherein the first electrodes are common electrodes configured to supply a common potential to a plurality of pixels in the display panel.

11. A detection apparatus comprising:
a substrate;
a plurality of first electrodes provided on the substrate;
a first selection circuit provided on the substrate, the first selection circuit including a plurality of first input terminals that receive a first control signal supplied from an outside and a plurality of first output terminals that output a first selection signal based on the first control signal;
a second selection circuit provided on the substrate, the second selection circuit including a plurality of second input terminals that receive a second control signal supplied from the outside and a plurality of second output terminals that output a second selection signal based on the second control signal, and
a counter circuit configured to generate the first control signal and the second control signal based on a clock signal supplied from the outside and output the first control signal and the second control signal to the first selection circuit and the second selection circuit, respectively,
wherein the first electrodes are supplied with a drive signal having a phase determined based on the first selection signal and the second selection signal, and $N \leq P \times Q$ is satisfied where N is the number of the first electrodes, P is the number of the first output terminals, and Q is the number of the second output terminals.

12. The detection apparatus according to claim 11, wherein the number of output terminals of the counter circuit is equal to the sum of the number of the first input terminals and the number of the second input terminals.

13. A detection apparatus comprising:
a substrate;
a plurality of first electrodes provided on the substrate;
a first selection circuit provided on the substrate, the first selection circuit including a plurality of first input terminals that receive a first control signal supplied from an outside and a plurality of first output terminals that output a first selection signal based on the first control signal;
a second selection circuit provided on the substrate, the second selection circuit including a plurality of second input terminals that receive a second control signal supplied from the outside and a plurality of second output terminals that output a second selection signal based on the second control signal;
a plurality of second electrodes configured to form capacitance between the second electrodes and the first electrodes; and
a detection electrode selection circuit configured to select at least one of the second electrodes,
wherein
the first electrodes are supplied with a drive signal having a phase determined based on the first selection signal and the second selection signal,
$N \leq P \times Q$ is satisfied where N is the number of the first electrodes, P is the number of the first output terminals, and Q is the number of the second output terminals,
the drive signal is simultaneously supplied to at least one of the first electrodes selected based on the first selection signal and the second selection signal,
the second electrodes output a detection signal corresponding to a change in capacitance,
the detection electrode selection circuit couples the at least one of the second electrodes based on a predetermined code to one output signal line, and
the detection electrode selection circuit couples a non-selected second electrode out of the second electrodes to a reference potential supply line configured to supply a reference voltage signal.

14. A detection apparatus comprising:
a substrate;
a plurality of first electrodes provided on the substrate;
a first selection circuit provided on the substrate, the first selection circuit including a plurality of first input terminals that receive a first control signal supplied from an outside and a plurality of first output terminals that output a first selection signal based on the first control signal;
a second selection circuit provided on the substrate, the second selection circuit including a plurality of second input terminals that receive a second control signal supplied from the outside and a plurality of second output terminals that output a second selection signal based on the second control signal; and
a plurality of second electrodes configured to form capacitance between the second electrodes and the first electrodes, wherein
the first electrodes are supplied with a drive signal having a phase determined based on the first selection signal and the second selection signal,
N≤P×Q is satisfied where N is the number of the first electrodes, P is the number of the first output terminals, and Q is the number of the second output terminals,
the drive signal is simultaneously supplied to at least one of the first electrodes selected based on the first selection signal and the second selection signal,
the second electrodes output a detection signal corresponding to a change in capacitance,
the first electrodes each include a plurality of electrode portions arrayed in a first direction and a plurality of couplers coupling the electrode portions in the first direction,
the first electrodes in which the electrode portions and the couplers are coupled are arrayed in a second direction intersecting the first direction, and
the second electrodes intersect the couplers in planar view, are arrayed in the first direction, and have a long side extending in the second direction intersecting the first direction.

15. The detection apparatus according to claim 14, wherein
the electrode portions are arrayed along the second electrodes, and
the width of the electrode portions is larger than the width of the second electrodes in the first direction.

16. The detection apparatus according to claim 14, wherein
the electrode portions are made of a translucent conductive material, and
the second electrodes are made of a metal material.

17. A detection apparatus comprising:
a substrate;
a plurality of first electrodes provided on the substrate;
a first selection circuit provided on the substrate, the first selection circuit including a plurality of first input terminals that receive a first control signal supplied from an outside and a plurality of first output terminals that output a first selection signal based on the first control signal; and
a second selection circuit provided on the substrate, the second selection circuit including a plurality of second input terminals that receive a second control signal supplied from the outside and a plurality of second output terminals that output a second selection signal based on the second control signal,
wherein
the first electrodes are supplied with a drive signal having a phase determined based on the first selection signal and the second selection signal,
N≤P×Q is satisfied where N is the number of the first electrodes, P is the number of the first output terminals, and Q is the number of the second output terminals,
the first electrodes are disposed in a matrix (row-column configuration), and
at least one of the first electrodes selected based on the first selection signal and the second selection signal output a detection signal corresponding to a change in capacitance in the respective first electrodes, and
a first electrode block including some of the first electrodes (=detection electrode block BKT) is coupled to a common output signal line and a signal obtained by integrating a plurality of the detection signals from the some of the first electrodes (in the first electrode block) is output to the output signal line.

* * * * *